United States Patent
Pell

(10) Patent No.: US 10,281,232 B2
(45) Date of Patent: May 7, 2019

(54) VIRTUAL REALITY ARCHERY TRAINING SYSTEM

(71) Applicant: Matthew Allen-Tesch Pell, Plainfield, IL (US)

(72) Inventor: Matthew Allen-Tesch Pell, Plainfield, IL (US)

(73) Assignee: AccuBow LLC, Peru, IL (US)

( * ) Notice: Subject to any disclaimer, the term of this patent is extended or adjusted under 35 U.S.C. 154(b) by 0 days.

(21) Appl. No.: 15/881,494

(22) Filed: Jan. 26, 2018

(65) Prior Publication Data

US 2018/0149444 A1    May 31, 2018

Related U.S. Application Data

(63) Continuation-in-part of application No. 15/215,289, filed on Jul. 20, 2016.
(Continued)

(51) Int. Cl.
*F41B 5/14*    (2006.01)
*A63B 69/00*    (2006.01)
(Continued)

(52) U.S. Cl.
CPC ...... *F41B 5/1476* (2013.01); *A63B 21/00069* (2013.01); *A63B 21/028* (2013.01); *A63B 21/0414* (2013.01); *A63B 21/157* (2013.01); *A63B 21/4043* (2015.10); *A63B 23/03508* (2013.01); *A63B 23/1209* (2013.01); *A63B 69/00* (2013.01); *A63B 71/0622* (2013.01);
(Continued)

(58) Field of Classification Search
USPC ....... 434/11, 247; 124/23.1, 24.1, 86; 463/2, 463/5, 31, 51, 52; 482/122, 126
See application file for complete search history.

(56) References Cited

U.S. PATENT DOCUMENTS

| | | | |
|---|---|---|---|
| 1,885,962 | A | 11/1932 | Swenson |
| 2,496,140 | A | 1/1950 | Virneburg |

(Continued)

FOREIGN PATENT DOCUMENTS

| | | |
|---|---|---|
| DE | 562787 | 10/1932 |
| DE | 7606299 | 7/1976 |

(Continued)

OTHER PUBLICATIONS https://matthewongamedesign.wordpress.com/2016/02/29/shortbowvr-virtual-reality-archery/; Matthias Zarzecki; ShortbowVR—Virtual Reality Archery; Blog; Feb. 29, 2016.
(Continued)

*Primary Examiner* — Kurt Fernstrom
(74) *Attorney, Agent, or Firm* — Barnes & Thornburg LLP

(57) ABSTRACT

An adjustable archery training bow assembly includes a single resistance element and an adjustment mechanism that can be actuated by a user to vary the tension level in the resistance element for training purposes. The training bow also includes a mount for receiving a mobile device, which allows the user to practice various augmented reality-archery training scenarios. The adjustable archery training bow is used to enhance the user's skills, such as his/her strength, stability, and accuracy to help deliver on-target an arrow fired from a real, non-training bow.

19 Claims, 14 Drawing Sheets

Related U.S. Application Data

(60) Provisional application No. 62/556,650, filed on Sep. 11, 2017, provisional application No. 62/231,889, filed on Jul. 20, 2015.

(51) Int. Cl.

| | | |
|---|---|---|
| *A63B 23/12* | (2006.01) | |
| *A63B 21/00* | (2006.01) | |
| *A63B 23/035* | (2006.01) | |
| *A63B 21/02* | (2006.01) | |
| *A63B 21/04* | (2006.01) | |
| *A63B 71/06* | (2006.01) | |
| *A63F 13/211* | (2014.01) | |
| *A63F 13/837* | (2014.01) | |
| *A63F 13/792* | (2014.01) | |
| *A63F 13/79* | (2014.01) | |
| *A63F 13/85* | (2014.01) | |

(52) U.S. Cl.
CPC ............ *A63F 13/211* (2014.09); *A63F 13/79* (2014.09); *A63F 13/792* (2014.09); *A63F 13/837* (2014.09); *A63F 13/85* (2014.09); *F41B 5/1426* (2013.01); *F41B 5/1492* (2013.01); *A63B 2071/0625* (2013.01); *A63B 2220/12* (2013.01); *A63B 2220/803* (2013.01); *A63B 2220/808* (2013.01); *A63B 2225/50* (2013.01); *A63B 2244/04* (2013.01)

(56) References Cited

U.S. PATENT DOCUMENTS

| | | | | |
|---|---|---|---|---|
| 2,769,179 | A | 11/1956 | Love | |
| 3,072,115 | A | 1/1963 | Johnson | |
| 3,108,583 | A | 10/1963 | Andis | |
| 3,256,015 | A | 6/1966 | Perrin | |
| 3,462,142 | A | 8/1969 | Sterndale | |
| 3,494,346 | A | 2/1970 | Yount | |
| 3,529,820 | A | 9/1970 | Templeton | |
| 3,665,911 | A | 5/1972 | Altier | |
| 3,749,075 | A | 7/1973 | Saunders | |
| 3,966,204 | A | 6/1976 | Dubach | |
| 3,983,860 | A | 10/1976 | Bolton | |
| 4,026,549 | A | 5/1977 | Gunn | |
| 4,041,926 | A | 8/1977 | Bomar | |
| 4,057,246 | A | 11/1977 | Wilson | |
| 4,066,051 | A | 1/1978 | Alban | |
| 4,079,933 | A | 3/1978 | Everroad | |
| 4,160,437 | A | 7/1979 | Fletcher | |
| 4,222,302 | A | 9/1980 | Sanfilippo | |
| 4,245,840 | A | 1/1981 | Van Housen | |
| 4,251,071 | A | 2/1981 | Norton | |
| 4,279,601 | A | 7/1981 | Cobelli | |
| 4,403,594 | A | 9/1983 | Todd | |
| 4,426,989 | A | 1/1984 | Sutton | |
| 4,441,707 | A | 4/1984 | Bosch | |
| 4,478,414 | A | 10/1984 | Molloy | |
| 4,489,705 | A | 12/1984 | Larson | |
| 4,509,497 | A | 4/1985 | Garvison | |
| 4,539,968 | A | 9/1985 | Garvison | |
| 4,544,155 | A | 10/1985 | Perry, Jr. | |
| 4,552,356 | A | 11/1985 | Brousseau | |
| 4,591,150 | A | 5/1986 | Mosher | |
| 4,609,191 | A | 9/1986 | Remme | |
| 4,741,320 | A | 5/1988 | Wiard | |
| 4,741,528 | A | 5/1988 | Church | |
| 4,854,212 | A | 8/1989 | Levin | |
| 4,854,293 | A | 8/1989 | Roberts | |
| 4,860,720 | A | 8/1989 | Todd | |
| 4,887,584 | A | 12/1989 | Carella | |
| 4,909,232 | A | 3/1990 | Carella | |
| 4,961,264 | A | 10/1990 | Topel | |
| 5,009,216 | A | 4/1991 | Ross | |
| 5,016,557 | A | 5/1991 | Miller | |
| 5,052,365 | A | 10/1991 | Carella | |
| 5,056,784 | A | 10/1991 | Craig | |
| 5,065,732 | A | 11/1991 | Smith | |
| 5,070,856 | A | 12/1991 | Plummer | |
| 5,163,413 | A | 11/1992 | Carella | |
| 5,165,584 | A | 11/1992 | Meagher | |
| 5,174,577 | A | 12/1992 | Stephen | |
| 5,277,170 | A | 1/1994 | Carella | |
| 5,314,396 | A | 5/1994 | Parr | |
| 5,353,780 | A | 10/1994 | Carella | |
| 5,566,951 | A * | 10/1996 | Dart | A63F 9/0291 273/358 |
| 5,592,928 | A | 1/1997 | Frasier | |
| 5,639,244 | A | 6/1997 | Stricklin | |
| 5,649,706 | A * | 7/1997 | Treat, Jr. | F41J 9/14 273/358 |
| 5,704,855 | A | 1/1998 | Kellogg, Jr. | |
| 5,741,207 | A | 4/1998 | Jordan | |
| 5,860,655 | A | 1/1999 | Starrett | |
| 5,885,196 | A | 3/1999 | Gvoich | |
| 6,425,765 | B1 | 7/2002 | Irwin, III | |
| 6,726,606 | B2 | 4/2004 | Jacobsen | |
| 6,776,148 | B1 | 8/2004 | Islas | |
| 6,860,816 | B2 | 3/2005 | Bond | |
| 6,935,863 | B2 | 8/2005 | Frigon | |
| 7,255,035 | B2 * | 8/2007 | Mowers | F41G 1/467 42/131 |
| 7,322,909 | B1 | 1/2008 | Lytell | |
| 7,387,599 | B1 | 6/2008 | Hsu | |
| 7,465,259 | B2 | 12/2008 | Mok | |
| 7,605,317 | B2 | 10/2009 | Chen | |
| 7,622,663 | B2 | 11/2009 | Casillas | |
| 7,647,922 | B2 * | 1/2010 | Holmberg | A01M 31/004 124/86 |
| 7,708,674 | B1 | 5/2010 | Saunders | |
| 8,065,807 | B2 * | 11/2011 | Rucinski | F41G 1/467 124/87 |
| 8,079,942 | B2 | 12/2011 | Anderson | |
| 8,273,973 | B2 | 9/2012 | Kimmons | |
| 8,282,493 | B2 * | 10/2012 | Roman | F41G 1/467 463/2 |
| 8,430,282 | B2 | 4/2013 | Sellers | |
| 8,507,779 | B1 | 8/2013 | Chen | |
| 8,583,446 | B2 | 11/2013 | Williams | |
| 8,657,708 | B2 | 2/2014 | Pijanowski | |
| 8,819,983 | B2 * | 9/2014 | Tate | F16M 11/041 124/88 |
| 8,893,701 | B1 * | 11/2014 | Entrup | G03B 29/00 124/86 |
| 8,971,959 | B2 * | 3/2015 | Hunt | F41G 11/004 455/556.1 |
| 9,163,913 | B2 | 10/2015 | Laporte | |
| 9,633,573 | B1 * | 4/2017 | Tafoya | G09B 19/0038 |
| 2003/0003425 | A1 | 1/2003 | Frigon | |
| 2004/0014010 | A1 | 1/2004 | Swensen et al. | |
| 2004/0043822 | A1 | 3/2004 | Bond et al. | |
| 2005/0123883 | A1 * | 6/2005 | Kennen | F41G 3/2611 434/11 |
| 2006/0024651 | A1 | 2/2006 | Davis | |
| 2007/0254786 | A1 | 11/2007 | Owen | |
| 2008/0032876 | A1 | 2/2008 | Mukenev | |
| 2009/0188369 | A1 | 7/2009 | Chen et al. | |
| 2009/0211432 | A1 | 8/2009 | Casillas et al. | |
| 2010/0075819 | A1 | 3/2010 | Maki | |
| 2011/0028288 | A1 | 2/2011 | Anderson | |
| 2011/0094365 | A1 | 4/2011 | Kimmons et al. | |
| 2011/0207512 | A1 | 8/2011 | Wang | |
| 2011/0260404 | A1 | 10/2011 | Laporte et al. | |
| 2012/0012621 | A1 | 1/2012 | Sellers | |
| 2012/0052988 | A1 | 3/2012 | Pijanowski | |
| 2013/0154191 | A1 | 6/2013 | Laporte et al. | |
| 2014/0318520 | A1 | 10/2014 | Laporte et al. | |
| 2016/0086507 | A1 | 3/2016 | Winters-Huete | |

(56) References Cited

U.S. PATENT DOCUMENTS

2016/0109940 A1* 4/2016 Lyren .................... H04W 4/023
463/2
2017/0167823 A1* 6/2017 Kirilov ................ F41B 5/1476

FOREIGN PATENT DOCUMENTS

| DE | 2917834 | 11/1980 |
|----|---------|---------|
| DE | 3231228 | 2/1984 |
| FR | 2707748 | 1/1995 |
| GB | 434067 | 8/1935 |
| WO | WO91/06820 | 11/2007 |

OTHER PUBLICATIONS https://www.youtube.com/watch?v=-zKoMQrmFcl; Laurid Bergjohann; Virtual Archery with real Bow, Arduino, IR-Tracking, Reed Sensors and Bluetooth; Website; Apr. 9, 2013.
https://treality.com/sony-psvr-ps4-compatible-games/; TReality; Website.
https://www.kickstarter.com/projects/rongreen/bowbladevideo-gaming-meets-archery?ref=discovery&ref=discovery&term=archery; Ron Green; BowBlade—Where Video Gaming Meets Archery; Website; Sep. 7, 2013.

* cited by examiner

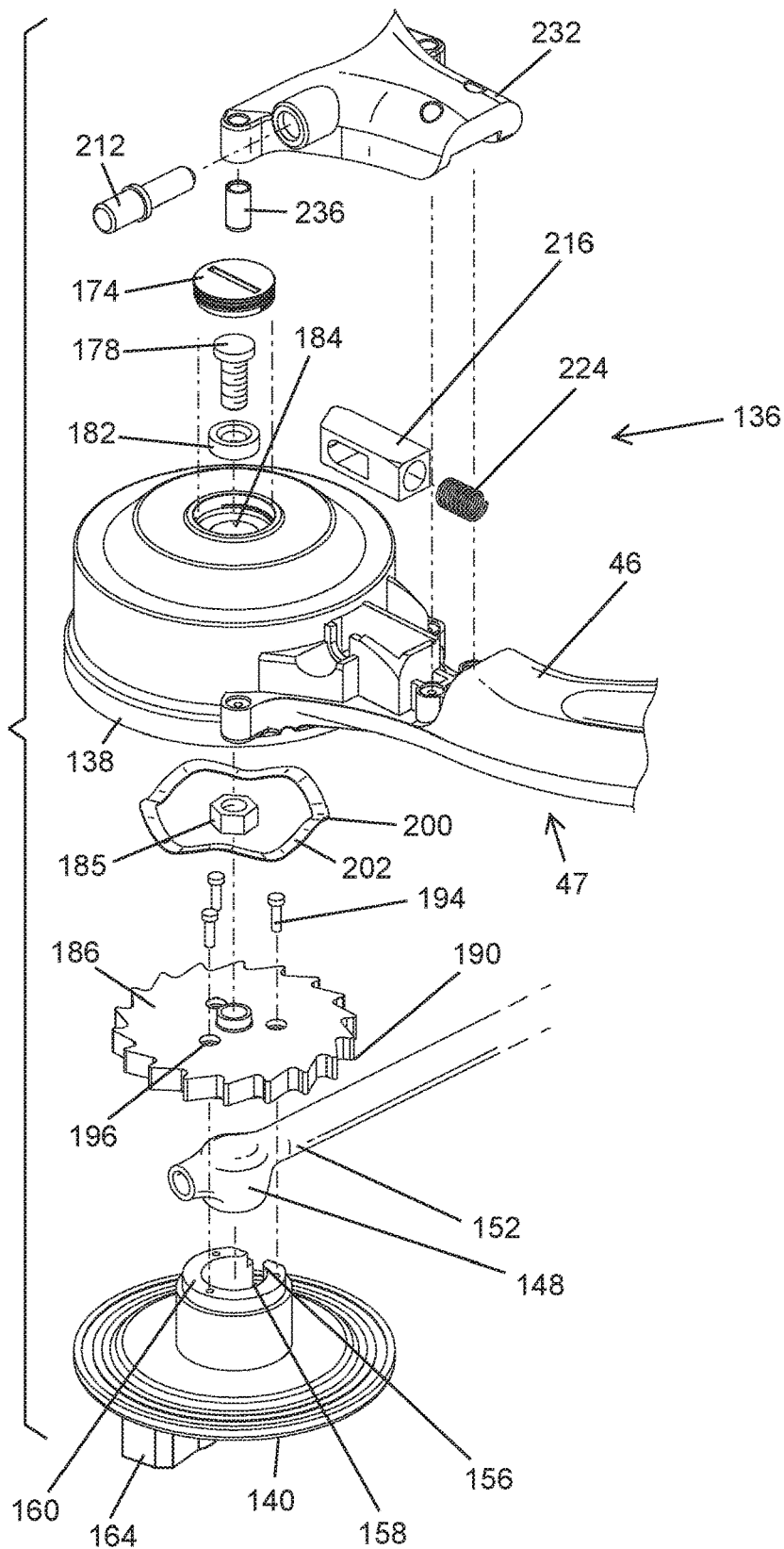

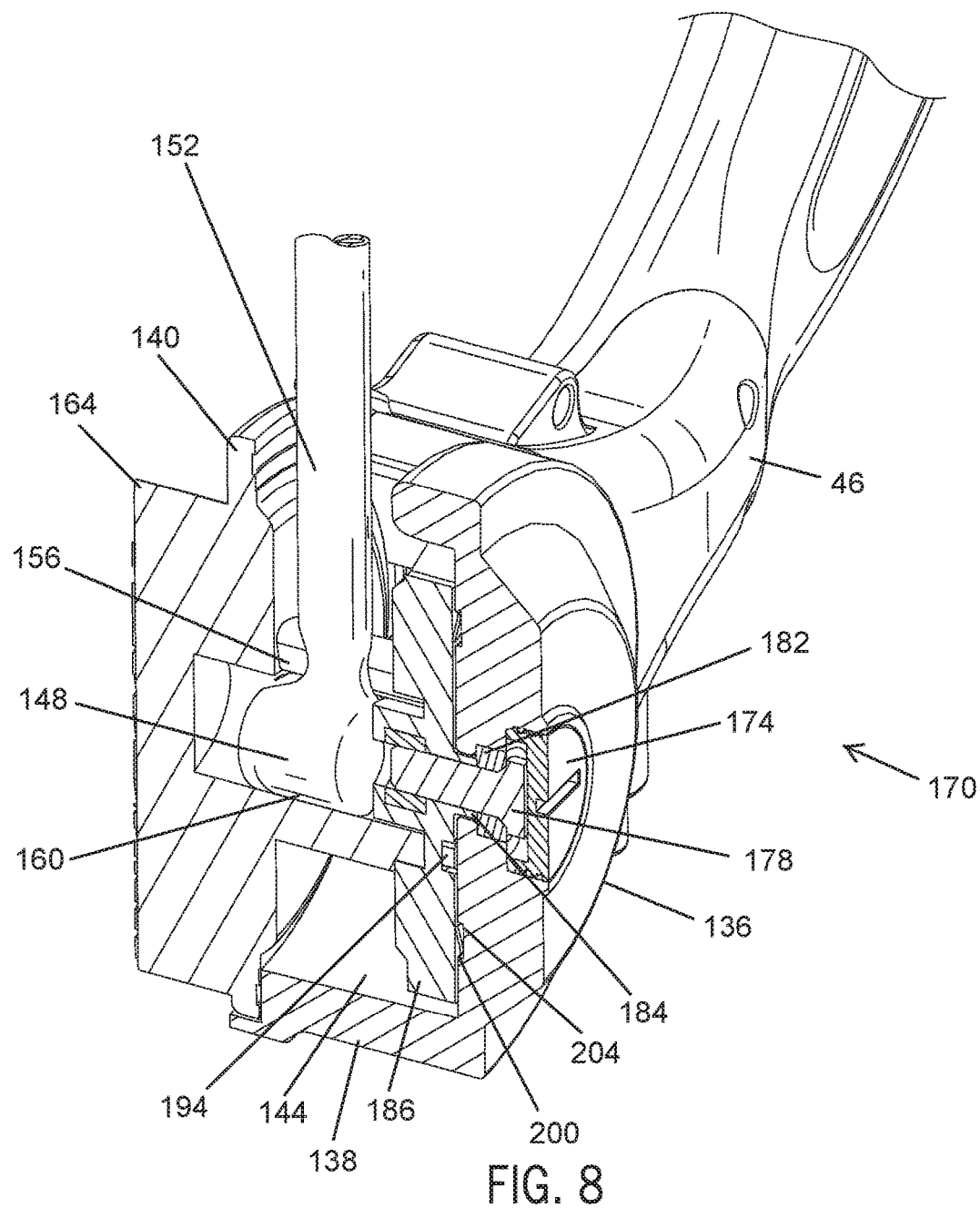

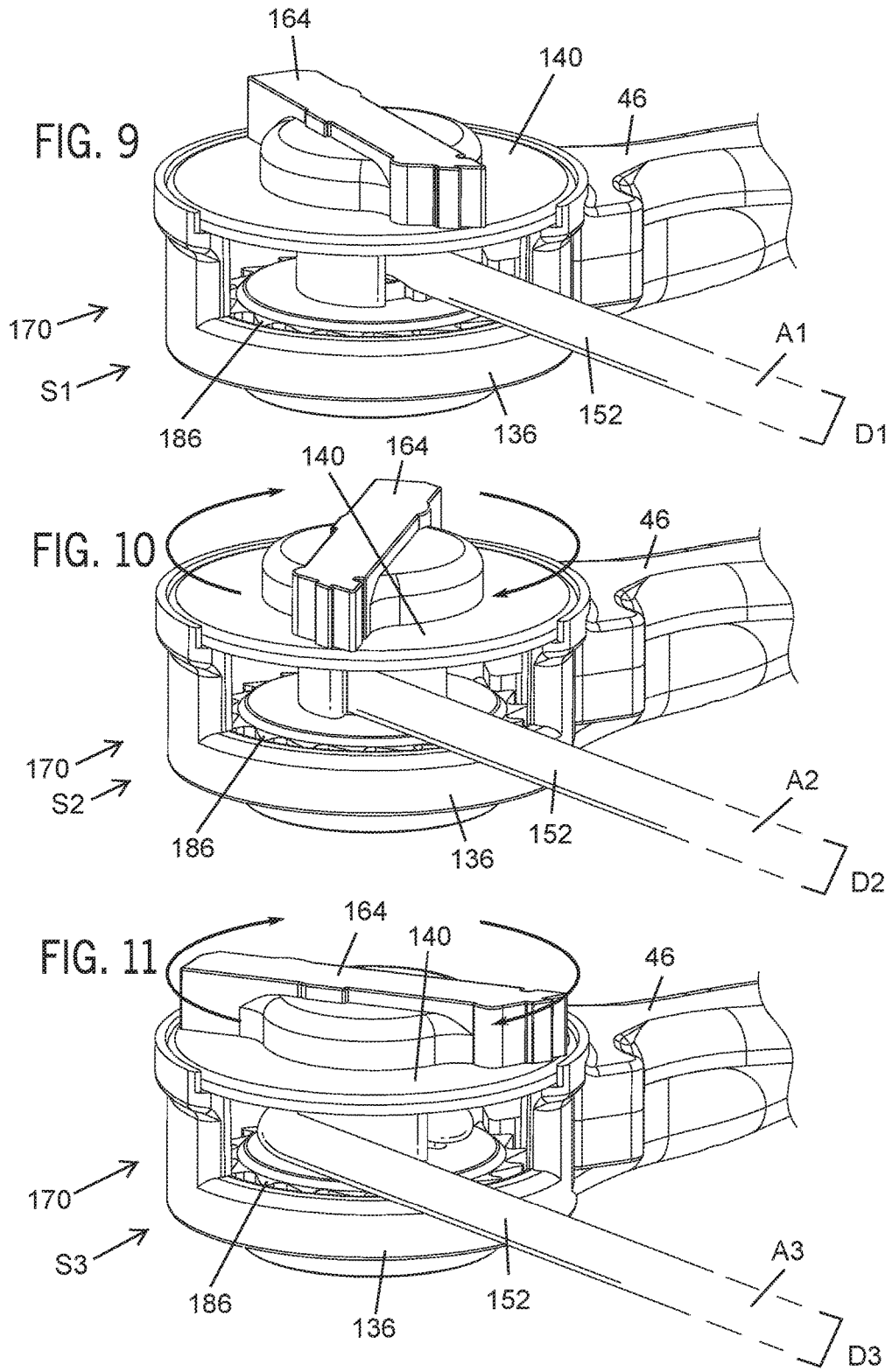

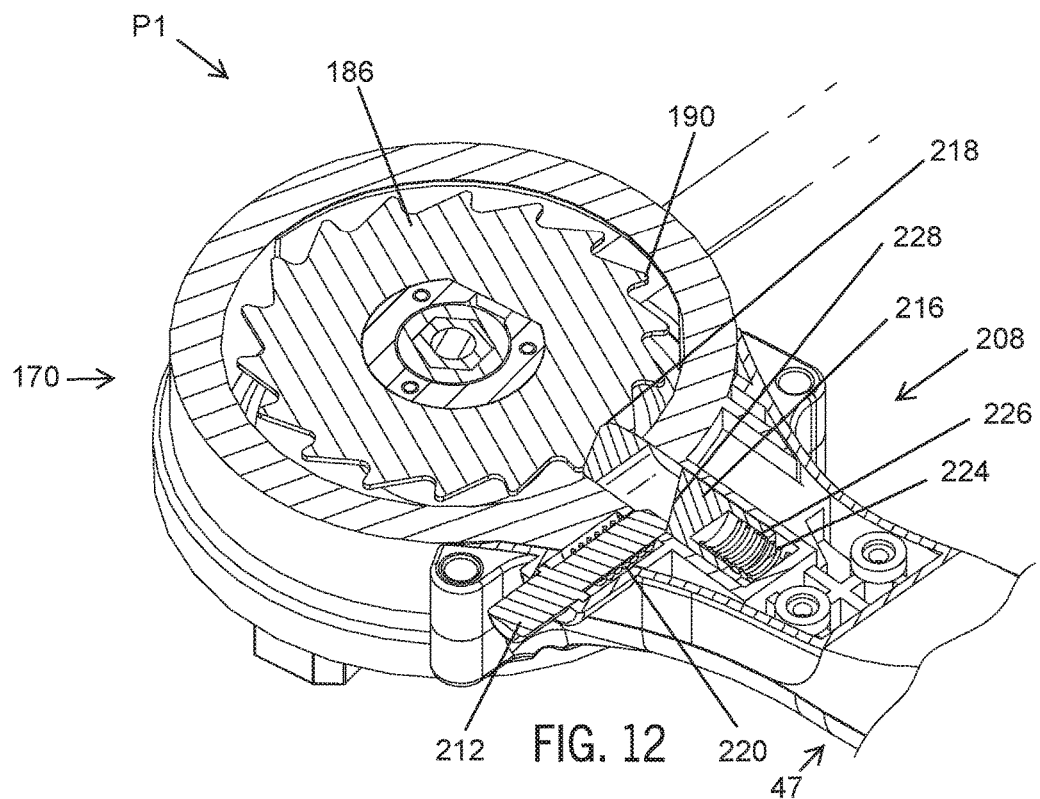
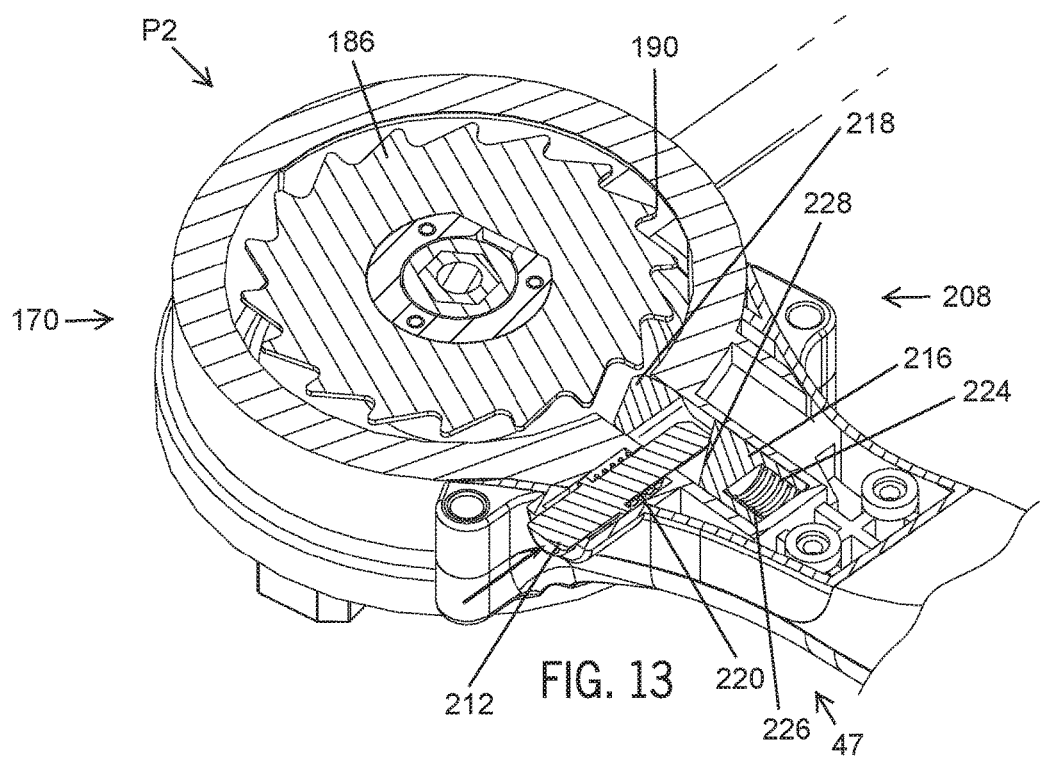

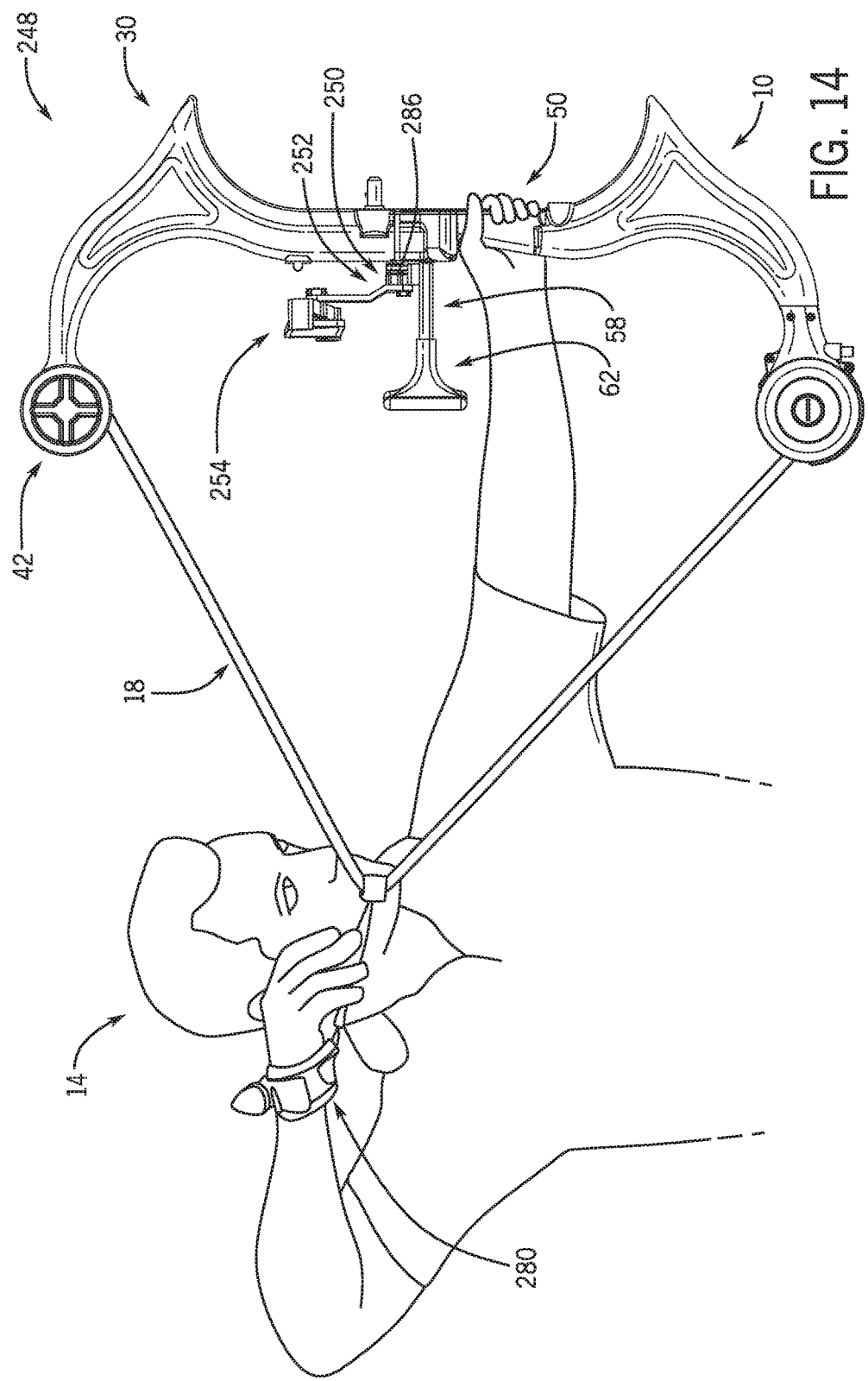

VIRTUAL REALITY ARCHERY TRAINING SYSTEM

CROSS-REFERENCE TO RELATED APPLICATIONS

This application claims priority from U.S. Provisional Patent Application No. 62/556,650, filed Sep. 11, 2017, and is a continuation-in-part (CIP) application of U.S. patent application Ser. No. 15/215,289, filed Jul. 20, 2016, which claims priority from U.S. Provisional Patent Application No. 62/231,889, filed Jul. 20, 2015, all of which are incorporated herein by reference and made a part hereof.

FEDERALLY SPONSORED RESEARCH OR DEVELOPMENT

None

TECHNICAL FIELD

This disclosure relates to a virtual reality archery training system that includes a training bow, a mobile device with an archery simulation application, a single resistance element and an adjustment mechanism that can be actuated by a user to selectively vary the tension level in the resistance element for training purposes.

BACKGROUND

Archery is a sport that dates back centuries. Archery practice, hunting and competitions can be found world-wide. An archer's technique, in terms of the archer's balance, stability, composure and strength, is critical for ensuring accuracy, range and consistency in delivering an arrow to the target. These skills can be acquired or improved through continual practice at different draw weights for the bow. However, such practice may be difficult considering time, financial and/or equipment constraints. Regarding this last constraint, there is no conventional training bow that provides an adequate platform for easily varying the draw weight without the use of extraneous tools and/or equipment. The ability to practice using multiple draw weights is also limited by the fact that an archer would need access to a range of bows with correspondingly different draw weight ranges, as most conventional bows have a draw weight range of only 30 pounds, at the most. Further, conventionally practicing the release of a bow is a crucial aspect of ensuring accuracy, range and consistency in delivering an arrow to the target. However, practicing the release of a conventional bow can only be achieved by releasing multiple live arrows, which requires an adequate facility. Thy-firing, or firing a conventional bow without an arrow, may damage a conventional bow. With a training bow that does not fire live arrows, users are limited to interacting with the bow and aiming in similar fashion as they would a conventional bow. Another shortcoming of existing training bows is that many, if not all, lack a sense of realism in bow size, shape and weight.

A number of virtual reality systems have recently developed archery like games. However, these games fail to simulate real life archery scenarios for a number of reasons, including the fact that these systems have wires that restrict a user's movement. In addition, these systems fail to simulate attributes of a user's bow, which include weight of the bow, draw weight, or draw length. Further, these systems fail to allow the user to modify the virtual bow to mimic the user's traditional bow that is capable of firing an arrow.

Accordingly, there is an unmet need for an archery training bow that can simulate real life archery scenarios to allow the archer to practice-in order to improve his/her accuracy while also managing psychological conditions, such as target panic.

SUMMARY

The present disclosure provides a virtual reality archery training system that includes an adjustable archery training bow, a mount for a mobile device, and a mobile device with an archery application installed thereon.

The mobile device included in the virtual reality archery training system has at least an intergrated magnetometer, MEMS gyroscope, and a display. The magnetometer is configured to provide an initial reference point for the archery application, while the MEMS gyroscope is configured to inform the archery application how far the mobile device has moved from the initial reference point. Both the magnetometer and the MEMS gyroscope are utilized by the archery application to render and alter the graphics on the intergrated disaply according to the movement of the mobile device.

The adjustable archery training bow includes a vibration damper and the mobile device includes a microphone, the microphone records the sound produced from the contact of the resistance member and the end of the vibration damper upon the draw and release of the resistance member. If the sound produced is greater than a predetermined level, then the archery application will fire a simulated arrow at the simulated target within the archery application.

The flight path of the simulated arrow may be displayed on the mobile device's screen. This flight path may be altered by a gravitional force or wind. After the flight path has been displayed, impact location of the simulated arrow may be displayed on the mobile device and points may be award to the user based on how close to the simulated target the simulated arrow landed.

The virtual reality archery training system provides simulated real life archery scenarios, such as Olympic target shooting, hunting, strength building, augmented reality archery training scenario, virtual reality archery challenge, and augmented reality archery challenge.

The virtual reality archery training system may also allow the user to enter their personal specifications to account for the user's height, their arrow speed, and/or the number of pins contained within their sight.

Other features and advantages of the disclosure will be apparent from the following specification taken in conjunction with the following drawings.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 7 is an exploded view of a second housing and a tension adjustment mechanism of the training bow.

FIG. 8 is a cross-sectional view taken along line 8-8 of FIG. 3, showing the tension adjustment mechanism of the training bow.

FIG. 9 is a perspective view of the tension adjustment mechanism and the resistance element in a first state.

FIG. 10 is a perspective view of the tension adjustment mechanism and the resistance element in a second state.

FIG. 11 is a perspective view of the tension adjustment mechanism and the resistance element in a third state.

FIG. 12 is a cross sectional view of the tension adjustment mechanism and a release mechanism in a released position.

FIG. 13 is a cross sectional view of the tension adjustment mechanism and a release mechanism in an engaged position.

FIG. 14 illustrates a virtual reality archery training system according to an embodiment of the present disclosure, showing a mobile device, a mobile device mount, and a resistance element of the training bow being held in the drawn position by a user.

DETAILED DESCRIPTION

Figure 1:
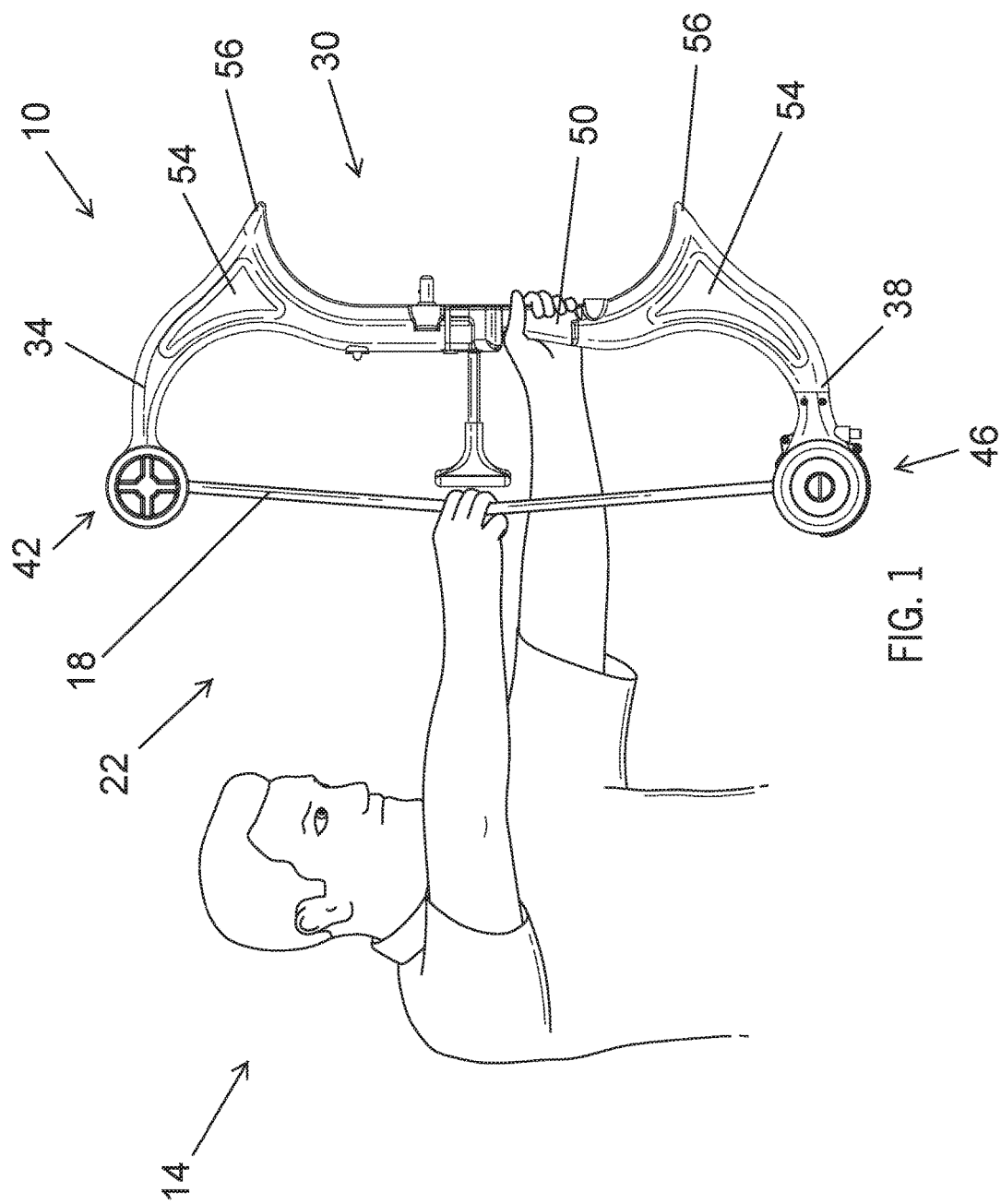
FIG. 1 illustrates an adjustable archery training bow according to an embodiment of the present disclosure, showing a resistance element of the training bow being drawn by a user from an initial position.

While this disclosure includes a number of details and embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated.

This disclosure relates to a virtual reality archery training system 280, which is comprised of an archery training bow 10, a mobile device mount 252, and a mobile device 254 with an archery application 256 installed thereon. The archery training bow 10 including a single resistance element 18 and an adjustment mechanism 170 that can be actuated by a user 14 to vary the tension level in the resistance element 18 for training purposes. The virtual reality archery training system 280 is used to enhance the user's skills, such as his/her strength, stability and accuracy in delivering an arrow fired from a real, non-training bow to the target. In addition, the virtual reality archery training system 280 simulates real life scenarios that an archer may face during a completion or during a hunt. Practicing in these scenarios allow the user to reduce target panic and improves performance.

Figure 2:
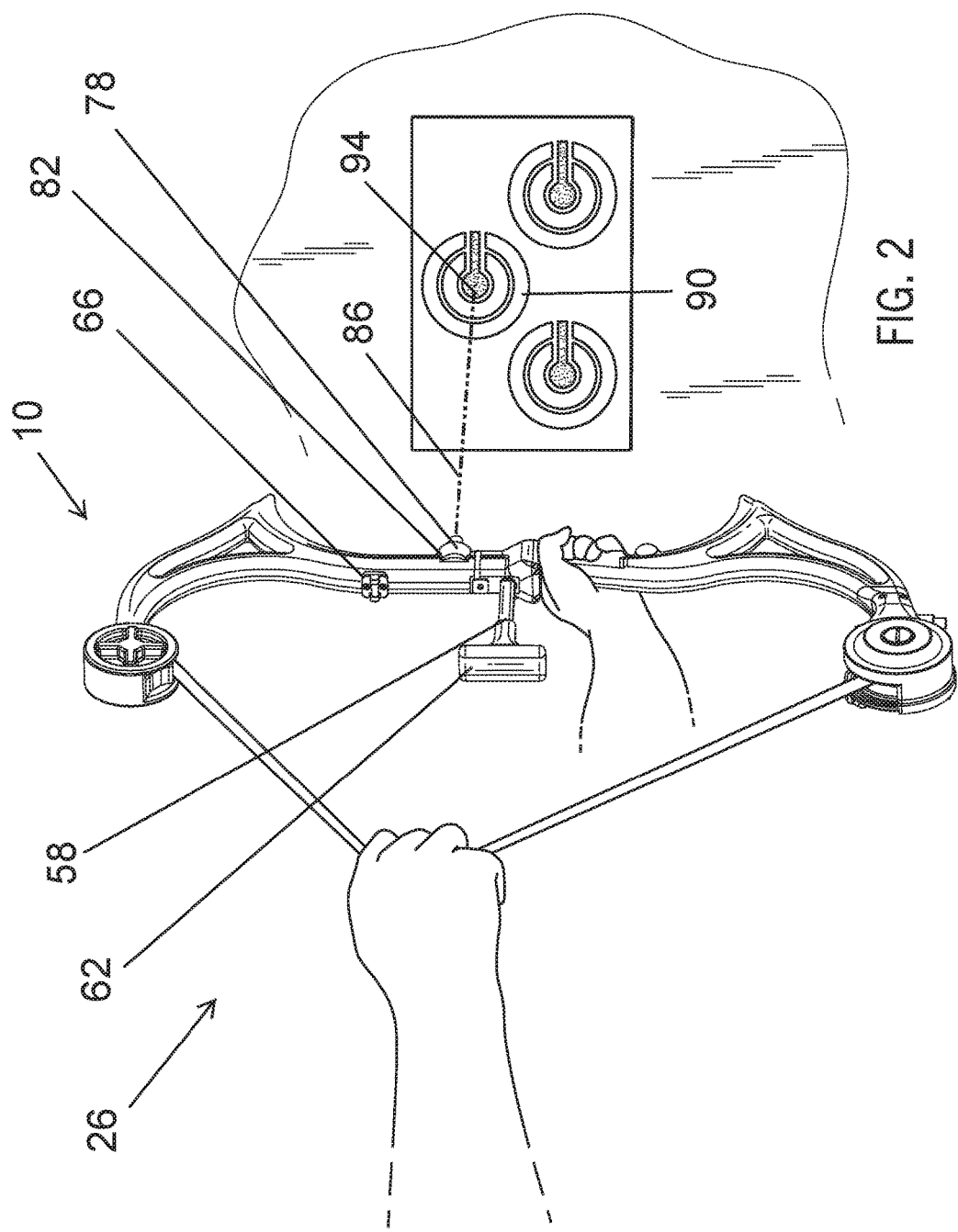
FIG. 2 is a perspective view of the training bow of FIG. 1, showing the user drawing the resistance element to a drawn position and a laser pointed on a wall-mounted target.
Figure 3:
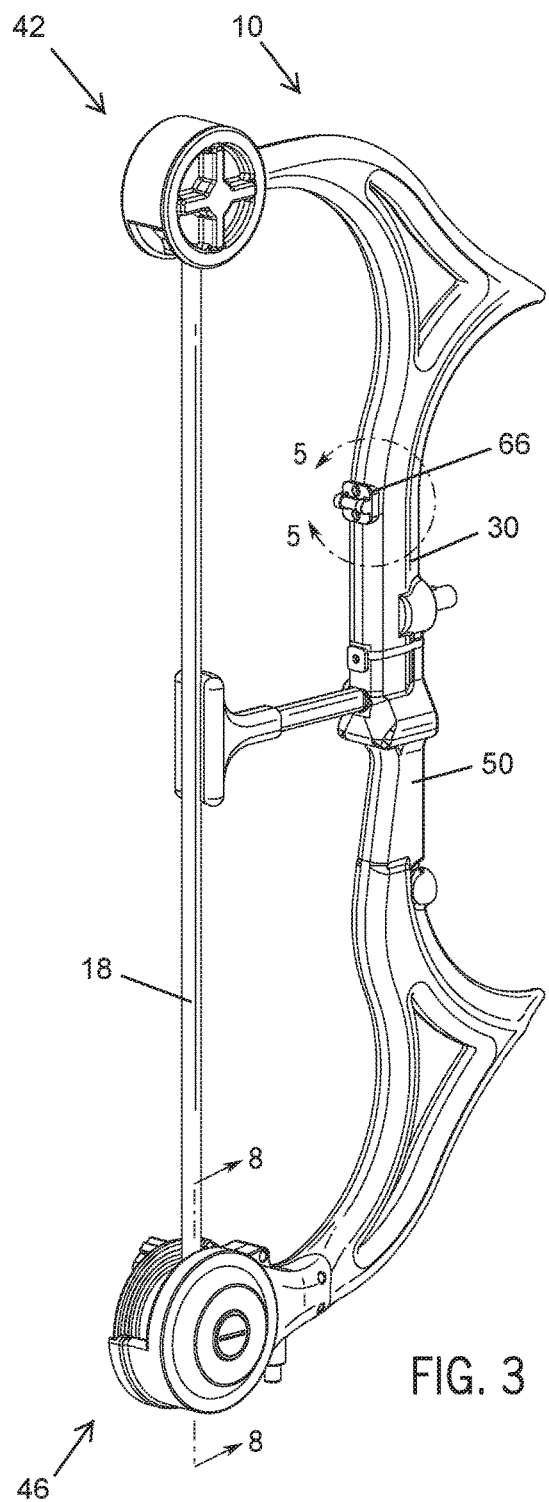
FIG. 3 is a right perspective view of the training bow.
Figure 4:
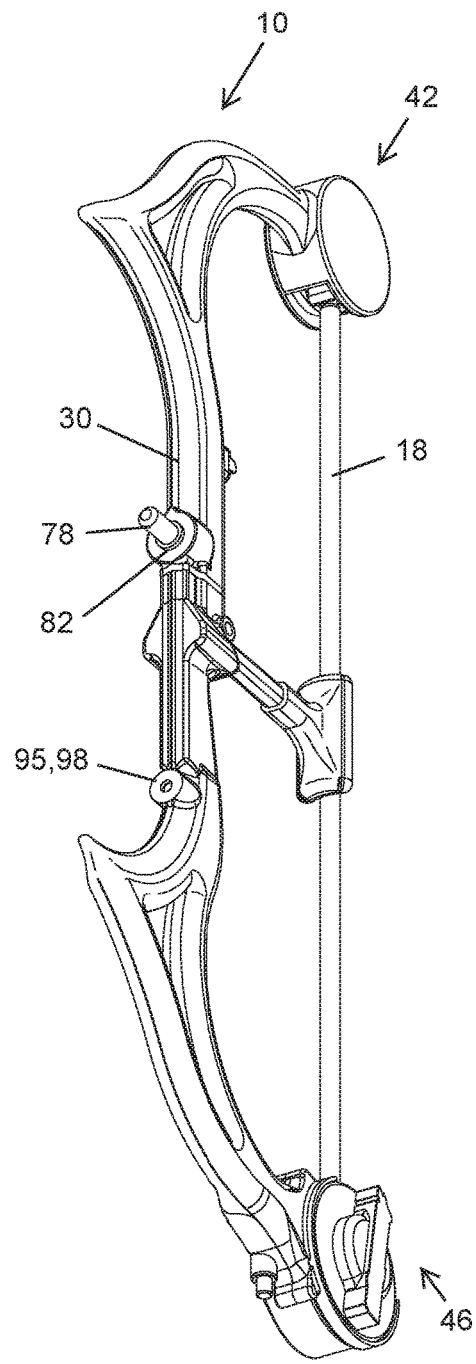
FIG. 4 is a left perspective view of the training bow.

As shown in FIGS. 1 and 2, the training bow 10 includes the resistance element 18 and a main body 30 including a first limb 34 and a second limb 38. In the embodiment shown in the Figures, the element 18 is configured as a flexible band or rubber tube that extends between a first end 42 of the first limb 34 and a second end 46 of the second limb 38. The main body 30 also includes an integral grip 50 formed in the second limb 38, where the user 14 places his hand to grasp the training bow 10. The main body 30 includes one or more apertures 54 formed adjacent to horns 56. In FIG. 1, the user 14 has begun to draw the resistance element 18 from an initial or first position 22. FIG. 2 shows the user 14 further drawing the resistance element 18 to a second or drawn position 26, where due to the change in its geometry, the resistance element 18 has increased tension compared to that of the first position.

The training bow 10 also includes a vibration damper 58 that extends laterally and rearward from the main body 30, preferably from a location above the grip 50. The vibration damper 58 terminates in a damper end 62, a rearward-facing surface of which may be concave in shape. When the user 14 draws and releases the resistance element 18, the released resistance element 18 contacts the damper end 62, and vibrations and energy from the released resistance element 18 are reduced through contact with the damper end 62.

Figure 5:
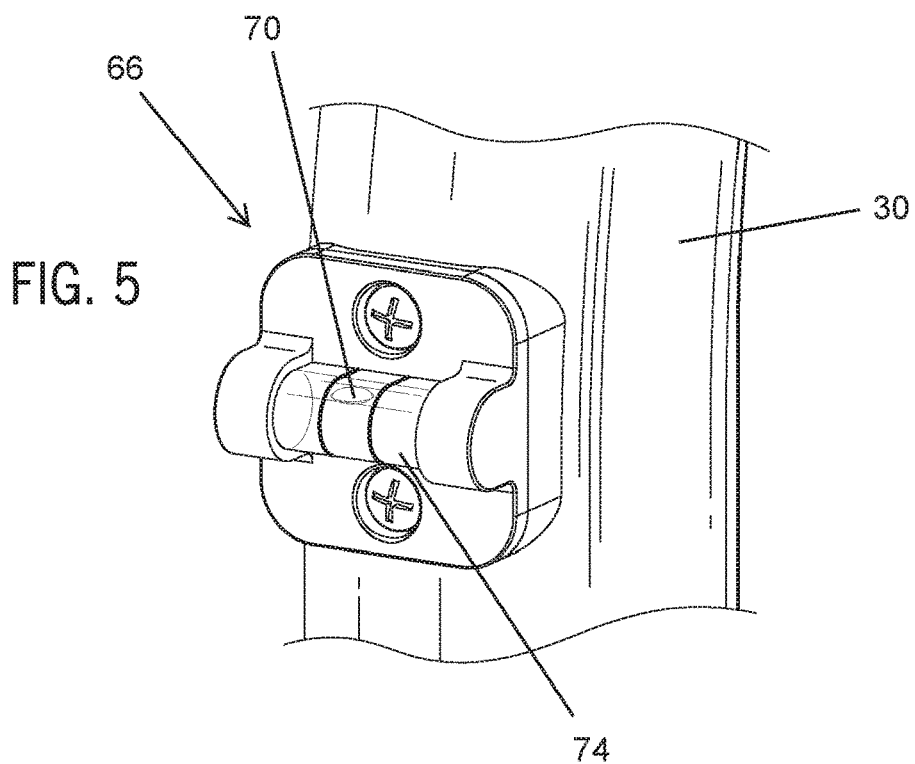
FIG. 5 illustrates a level mounted to a portion of the training bow.

The main body 30 may also include a level 66, as best shown in FIGS. 2 and 5. The level 66 indicates the orientation of the bow 10 to the user 14, about an axis or a surface (e.g., the ground). Thus, the user 14 can quickly and easily determine an orientation of the bow 10 about the axis, which may be an axis coincident with, or substantially parallel to, a laser beam 86, described below. The level 66 can be a mechanical level that includes a gas bubble 70 within a fluid 74 in a marked tube. An instant location of the gas bubble 70 within the fluid 74 provides the user 14 with a simple and reliable orientation indicator for bow 10.

The main body 30 of the training bow 10 also includes a laser sight 78. The laser sight 78 mounts to the main body 30 via a laser port 82. As shown in FIG. 2, the laser sight 78 produces the laser beam 86 originating from the laser sight 78 and travelling to a target 90. Upon reaching the target 90, the laser beam 86 produces a visible laser point 94 on the target 90. By watching the laser beam 86 and/or the laser point 94, the user 14 can monitor stability and consistency when using the training bow 10, namely drawing and releasing the resistance element 18. The main body 30 may also include one or more attachment ports 95. One or more of the attachment ports 95 may be a stabilizer port 98, and may be used to mount a stabilizer (not shown). The stabilizer port 98 allows users 14 to attach a conventional bow stabilizer to adjust the weight and forward balance of the adjustable archery training bow 10 based on user 14 preference, such that the user 14 can simulate the feel of a conventional bow that they use to fire live arrows.

Figure 6:
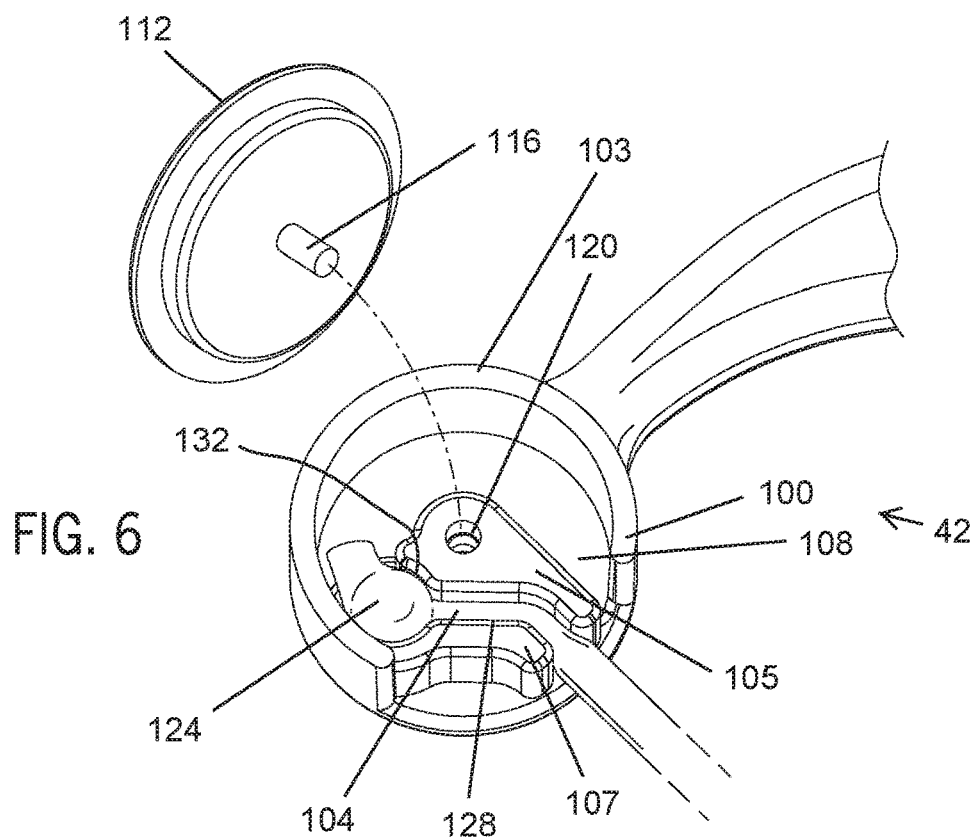
FIG. 6 illustrates a first housing of the training bow, showing a first end of a resistance element secured within the first housing.
Figure 16:
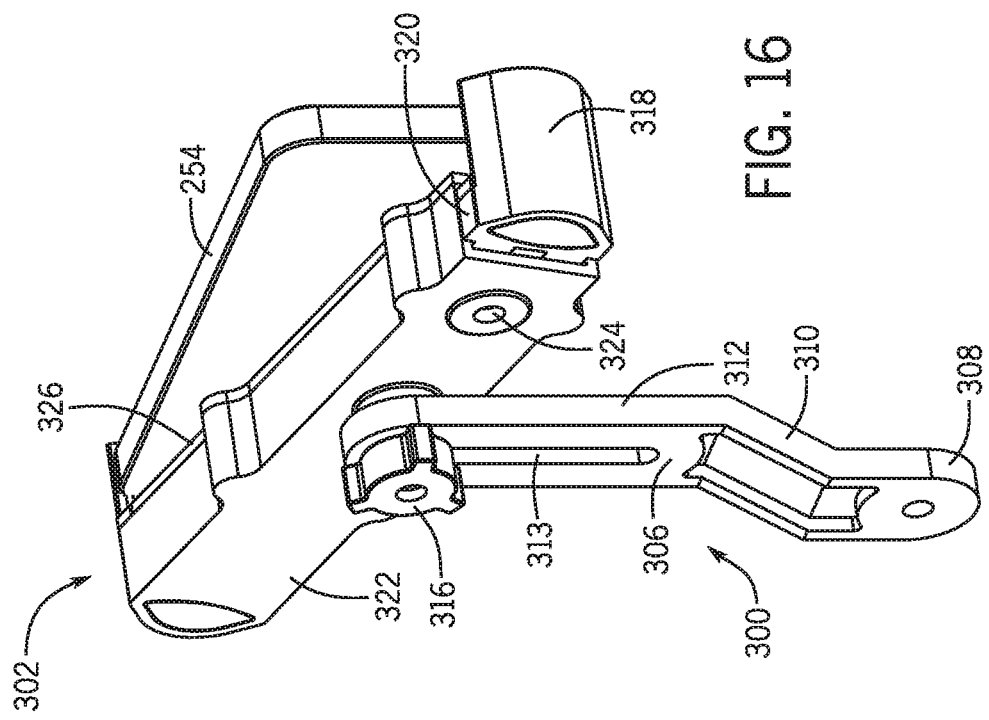
FIG. 16 is a rear perspective view of the mobile device mount shown in FIG. 14.

The first end 42 of the main body 30 includes a first housing 100 that receives and secures a first end 104 of the resistance element 18, as shown in FIG. 6. The first housing 100 includes a side wall 103 that extends along a substantial extent of the periphery of the housing 100 while exposing a gap that allows for reception of the resistance element 18, as discussed below. A first housing cover 112 is removably attached to the first housing 100 to define a first housing cavity 108. A first housing fastener 116, such as a pin or threaded screw, extends from an inner surface of the first housing cover 112 and is received by a receptacle 120 formed in a first internal retaining body 105 of the first housing 100, wherein the cover 112 is removably connected to the housing 100. The first housing 100 also includes a second internal retaining body 107 that is cooperatively positioned with the first internal retaining body 105 to define a retaining channel 128 that extends inward from a periphery of the first housing 100. The removable connection between the first housing cover 112 and the first housing 100 allows the user 14 to access to the first housing cavity 108 for maintenance or replacement of the resistance element 18 and/or the first end 104 of the element 18.

The resistance element first end 104 may include a first securing element 124, such as a bead, ball-bearing, rod and pin that is located within the first end 104. Alternatively, the first end 104 could be tied in a knot to define the securing element 124. By various mechanical means, including crimping, adhesives or other techniques, the first securing element 124 is securely attached to the resistance element first end 104. A portion of the resistance element first end 104 extends through the retaining channel 128 and reaches a first receptacle 132 which securely retains the first securing element 124 and an adjacent extent of the resistance element first end 104, thus securing the first end 104 of the resistance element 18 to the first end 42. The second end 46 of the main body 30 includes a second housing 136 that adjustably secures a second end 152 of the resistance element 18, as shown in FIGS. 7-13. The second housing 136 includes a circular side wall 138 that mates with a second housing cover 140 to cooperatively form a second housing cavity 144. By various mechanical arrangements and as discussed below, the second housing cover 140 is rotatably connected to the second housing 136. Similar to the first securing element 124, a second securing element 148 is securely attached to the resistance element second end 152. The second securing element 148 may a bead or ball-bearing that is enclosed within or retained by a resistance element second end 152 by various mechanical means, including crimping, adhesives or other attachment techniques. The second end of the resistance element 152 extends through a second channel 156 formed in a boss 158 extending from an inner surface of the second cover 140 and reaches a second receptacle 160 in the boss 158. The second receptacle 160 securely retains the second securing element 148 and an adjacent extent of the resistance element second end 152, thus securing the second end of the resistance element 152 to the second housing cover 140. Accordingly, as the second housing cover 140 is rotatably connected to the second housing 136, the second end of the resistance element 152 is also rotatably connected to the second housing 136. Further, the second end of the resistance element 152 is also rotatably connected to the second end 46 of the bow 10.

As best shown in FIGS. 7 and 8, the second end 46 includes the tension adjustment mechanism 170 that is configured to vary the tension of the resistance element 18 between its first end 104 and second end 152. In an embodiment, the user 14 can vary the tension of the resistance element 18 by manipulating the adjustable tension mechanism 170. In particular, the user 14 can vary the tension of the resistance element 18 by grasping a handle 164 formed on the external surface of the second housing cover 140 and rotating the second housing cover 140 relative to the second housing 136.

Referring to FIGS. 7-13, the adjustment mechanism 170 includes a cover piece 174, a bolt 178, a washer 182, a ratchet wheel 186 and means for restricting undesired rotation 200. The rotation restricting means 200 is configured as a ring 202, washer or spacer. The bolt 178 extends through the washer 182 and a second housing aperture 184 and threadably connects to a ratchet wheel 186 positioned within the second housing 136. Referring to FIG. 8, the bolt 178 threadably attaches to a nut 185 embedded in the ratchet wheel 186. The ratchet wheel 186 includes a plurality of teeth 190 arranged along the outer periphery of the ratchet wheel 186. Fasteners 194, such as screws or pins, extend through wheel apertures 196 and attach to the second housing cover 140 via the boss 158, such that the ratchet wheel 186 rotates with the second housing cover 140 when it is actuated by the user 14. Further, the securing of the ratchet wheel 186 with the boss 158 assists in securing the second securing element 148 and the resistance element second end 152 within the second receptacle 160. The ring 202 is disposed within a circumferential track 204 formed in an internal wall of the second housing 136. The ring 202 is relatively thin metal object with a wavy, non-planar configuration. The ring 202 is further disposed between the second housing 136 and the ratchet wheel 186, whereby the ring 202 serves to frictionally limit rotation between the second housing 136 and the second housing cover 140 by imparting a frictional force on the ratchet wheel 186 and/or the second housing 136.

The adjustment mechanism 170 further includes a release mechanism 208 positioned adjacent the second housing 136 in a neck region 47 of the second end 46 of the main body 30. The adjustment mechanism 170 comprises an actuator 212, a pawl 216, a coil spring 220 that receives an extent of the actuator 212 and a coil spring 224 that resides substantially within pawl 216. The pawl 216 is moveable between an engaged positions P1 (see FIG. 12) and a released position P2 (see FIG. 13), the latter causing a tip 218 of the pawl 216 to be engaged with the teeth 190 of the ratchet wheel 186. When the pawl 216 is in the engaged position P1, as illustrated in FIG. 12, the ratchet wheel 186 is rotatable in one direction (e.g., counter-clockwise) but not in another direction (e.g., clockwise). This rotational aspect corresponds to the ratchet wheel 186 being rotatable in a direction that increases the tension in the resistance element 18 while not being rotatable in a direction that decreases the tension in the resistance element 18. When the pawl 216 is in the released position P2, as illustrated in FIG. 13, the ratchet wheel 186 is rotatable in both directions (e.g., counter-clockwise and clockwise). The actuator 212, configured as a depressible button, is biased away from the pawl 216 by the spring 220, while the pawl 216 is biased towards the ratchet wheel 186 and the engaged position P1 by the pawl spring 224, which resides within a cavity 226 formed in the neck region 47 of the second end 46. In operation, the user 14 depresses the actuator 212 inward and toward the pawl 216 in the direction shown by the arrow in FIG. 13. The actuator 212 acts on an inclined surface 228 of the pawl 216 and thereby moves the pawl 216 into the released position. The release mechanism 208, and components thereof, are secured and contained in the second end 46 by a release cover 232. When the user 14 removes pressure from the actuator 212, the actuator 212 moves away from the pawl 216 and the pawl 216 moves towards and into contact with the ratchet wheel 186 and the adjustment mechanism 170 returns to the engaged position P1 of FIG. 12.

FIGS. 9-11 illustrate embodiments of first, second and third states, respectively, of the tension adjustment mechanism 170 and the resistance element 18, focusing on the second end 152 of the resistance element 18. The various states impact the draw weight of the element 18, which is a measure of the force needed to pull the element 18 from the initial position (see FIG. 1) to the drawn position P2 (see FIG. 2). FIG. 9 shows the adjustment mechanism 170 and the resistance element 18 in a first state of tension S1. FIG. 10 shows the adjustment mechanism 170 and the resistance element 18 in a second state of tension S2 which places the element 18 in greater tension than that of the first tension state S1. Additionally, the draw weight of the resistance element 18 in the second state S2 is greater than the draw weight of the resistance element 18 in the first state S1. Further, a cross-sectional area A2 and a cross-sectional diameter D2 of the resistance element 18 in the second state S2 is less than a cross-sectional area A1 and a cross-sectional diameter D1 of the resistance element 18 in the first state S1. The user 14 can grasp and actuate the handle 164 to rotate the second housing cover 140 relative to the second housing 136, which selectively increases the tension and draw weight of the resistance element 18. Actuating the handle 164 in the clockwise direction causes the second end of the resistance element 152 to progressively wrap around the second bead receptacle 160 and the boss 158 of the second housing cover 140 and within the second housing cavity 144, thereby increasing the tension between the opposed ends of the element 18 and its draw weight. The user 14 rotates the handle 164 in a clockwise direction shown by the arrow in FIG. 10 to increase the tension of the resistance element 18 and move from the first state S1 to the second state S2.

FIG. 10 shows the resistance element 18 and the adjustment mechanism 170 in a third state of tension S3 which the user 14 has selectively arrived at by further actuating the handle 164. In the third state S3, the element 18 is in greater tension than that of the first or second states S1, S2. Also, the draw weight of the resistance element 18 in the third state S3 is greater than the draw weight in either the first or second states S1, S2. Further, a cross-sectional area A3 and a cross-sectional diameter D3 of the resistance element 18 in the third state is less than cross-sectional areas A1 and A2, as well as cross-sectional diameter D1 and D2 of the resistance element 18. Thus, the cross-sectional area A of and cross-sectional diameter D of the resistance element 18 vary inversely with the tension of the resistance element 18. As the tension of the resistance element 18 increases, the cross-sectional areas and diameters decrease, and as the tension of the resistance element 18 decrease, the cross-sectional areas and diameters increase.

The user 14 can grasp and actuate the handle 164 to rotate the second housing cover 140 relative to the second housing 136 in the manner described above. Further actuating the handle 164 in the clockwise direction causes a greater extent of the second end of the resistance element 152 to progressively wrap around the second bead receptacle 160 and the boss 158 of the second housing cover 140 and within the second housing cavity 144, thereby further increasing the tension between the opposed ends of the element 18 and its draw weight. The user 14 rotates the handle 164 in a clockwise direction shown by the arrow in FIG. 11 to increase the tension of the resistance element 18 and move the second state S2 to the third state S3.

As explained above, the user 14 can actuate the handle 164 of the adjustment mechanism 170 to move the resistance element 18 from the first state S1 to the second state S2 to the third states S3 regardless of the relative position of the pawl 216 and the ratchet wheel 186. However, the engagement between the pawl 216 and the teeth 190 of the ratchet wheel 186 precludes decreasing the tension in the resistance element 18 and moving from the third state S3 to either the second state S2 or the first state S1. To decrease the tension in the resistance element 18 and move from the third state S3 to either the second state S2 or the first state S1, the user 14 depresses the actuator 212 to move the pawl 216 to the released position P2 (see FIG. 13) and turns the handle 164 in the counter-clockwise direction which rotates the second housing cover 140 relative to the second housing 136. This rotation causes an extent of the second end of the resistance element 152 to progressively un-wrap, or unwind, from the second bead receptacle 160 and the boss 158 of the second housing cover 140, whereby the tension in the resistance element 18 is decreased.

When the user 14 wants to decrease the tension in the resistance element 18 and depresses the actuator 212 to move the pawl 216 to the released position P2 as part of the process of reducing the tension, the ring 202 prevents rapid unwinding of the second end of the resistance element 152 from the boss 158 by exerting an internal retaining force on the ratchet wheel 186 that is only overcome by the user 14 physically actuating the handle 164. In this manner, the rotation restricting means 200, for instance the ring 202, frictionally reduces a relative rotation rate of the ratchet wheel 186. Therefore, until the user 14 depresses the actuator 212 and physically actuates the handle 164, the ring 202 prevents unwanted rotation of the ratchet wheel 186 that would lead to a rapid unwinding of the second end 152 and a reduction in the tension of the resistance element 18. Alternatively, the rotation restricting means 200, including the ring 202, can be configured to apply a lesser internal retaining force on the ratchet wheel 186 when the user 14 depresses the actuator 212 whereby the wheel 186 rotates slowly and the second end 152 unwinds slowly from the boss 158 in a steady, controlled manner that does not require physical actuation of the handle 164. In this configuration, actuation of the handle 164 by the user 14 could increase the speed at which the second end 152 unwinds and the reduction in the tension of the resistance element 18.

It is further contemplated that the resistance element 18 is replaceable by removing elements of the adjustable tension mechanism 170 and the first housing cover 112 for maintenance or for installing resistance elements 18 with different mechanical properties or dimensions (e.g., replacing a first element 18 with a thicker, second element 18 to provide even greater draw weight). Additionally, in a non-limiting embodiment, the tension or resistance of the resistance element 18 is adjustable between 10 and 70 pounds by the user 14 via the adjustable tension mechanism 170. Elements and components of the adjustable archery training bow 10, as described above, can be formed from any number of materials, including metals, alloys, polymers, ceramics and composite materials, including plastics and carbon fiber-reinforced polymers.

FIGS. 14-24 relate to a virtual reality archery training system 248, which is comprised of an archery training bow 10, mobile device mount 252, mobile device 254, and an archery application or "app" 256. In particular, the mobile device mount 252 enables the user 14 to mount the mobile device 254 to the archery training bow 10. The mounted mobile device 254 operates with the archery application or "app" 256 to simulate real life archery scenarios, such as hunting and/or Olympic target shooting.

The main body 30 of the archery training bow 10 includes one or more attachment ports 95, wherein one of these attachment ports 95 is a mount port 250. Here, the mount port 250 includes a threaded receiver (not shown) and an outthrust 286. The threaded receiver accepts an extent of a bolt 288, which is used to releasably couple the mobile device mount 252 to the main body 30. It should be understood that other types of mechanical couplers may be used instead of a threaded connector, such as a pin and socket, a quarter-turn connector, bayonet connector, etc. The outthrust 286 helps ensure that the mobile device mount 252 is positioned parallel to the main body 30, which in turn ensures that the mobile device 254 can accurately position the sight 258 in relation to the main body 30. The mount port 250 is positioned between the first end 42 and the grip 50 of the bow 10. This position places the mobile device 254 where a traditional bow sight would be located on a traditional bow, which enables the mobile device 254, through the installation and use of the archery application 256, to simulate what the user 14 would see through a traditional bow sight.

FIGS. 14-16 and 19 show the mobile device mount 252. The mount 252 is configured to engage and grip the periphery, namely the corners, of the mobile device 254. The mobile device mount 252 is comprised of a mounting arm 300 and a mobile device holder 302. The mounting arm 300 has a first side 304 that is directed towards the user 14 when the mounting arm 300 is affixed to the bow 10, and a second side 306 that is disposed opposite of the first side 304. The mounting arm 300 also has three connected sections: a lower section 308, a middle section 310, and an upper section 312. The second side 306 of the lower section 308 is configured to be coupled to the mount port 250. In certain embodiments, lower section 308 may include a recess that receives an extent of outthrust 286. This configuration helps ensure that the mounting arm 300 is parallel with the main body 30. Also, the lower section 308 and the upper section 312 are substantially parallel to one another, while the middle section 310 is slanted in comparison to the lower section 308 and the upper section 312. This configuration helps ensure that the mobile device mount 252 does not interfere or contact the level 66 or other parts of the main body 30.

The mounting arm 300 is coupled to the mobile device holder 302 by a bolt/nut. Specifically, the head of the bolt is disposed within the mobile device holder 302, while the body of the bolt is configured to extend through a hole (not shown) formed in the mobile device holder 302 and through a slot 313 formed in the upper section 312 of the mounting arm 302. A nut is configured to engage the body of the bolt proximate to the second side 306 of the mounting arm 300. A knob 316 surrounds the nut to ease the user's 14 ability to tighten or loosen the nut. This configuration allows the user 14 to alter the vertical positioning of the mobile device 254 in relation to the main body 30. For example, the user 14 may desire to raise the position of the mobile device 254. To do this, the user 14 loosens the nut by turning the knob 316 in the counterclockwise direction to release the pressure on the mounting arm 300. Once the pressure has been released, the user 14 can slide the mobile device holder 302 upwards in comparison to the mounting arm 300. Once the mobile device holder 302 is in the desired position, the user 14 turns the knob 316 in the clockwise direction to tighten the nut against the mounting arm 300. During this process, two grooves 314 function in connection with two projections (not shown) that extend from the mobile device holder 302 to help ensure that the mobile device holder 302 retains the same relative angle (e.g., 45°) in comparison to the mounting arm 300. It should be understood that other coupling methods may be used instead of a bolt/nut, such as a quarter turn connector or other types of coupling devices.

Figure 15:
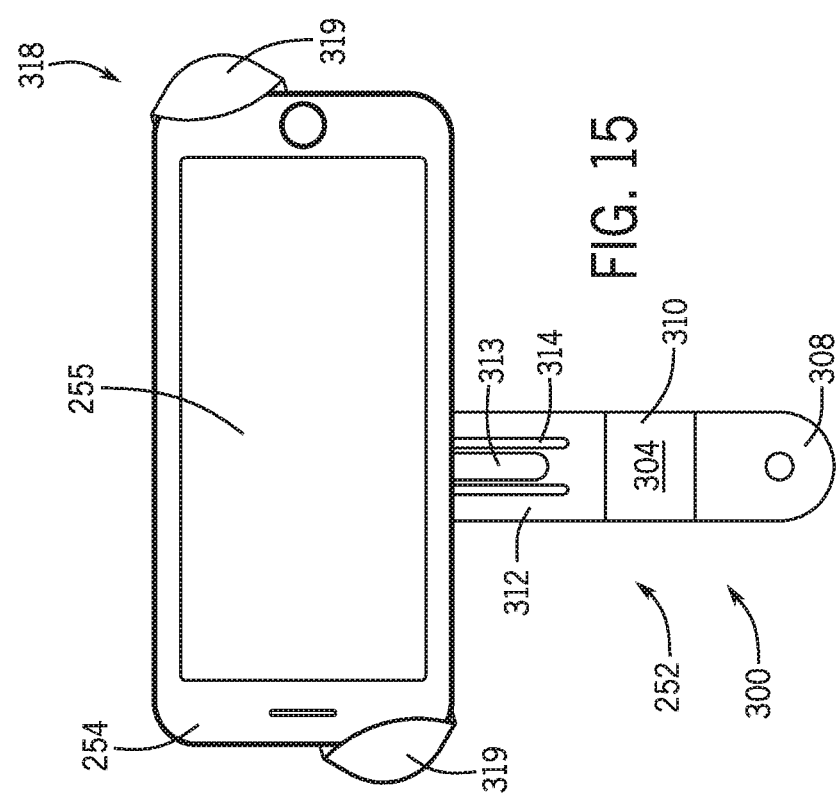
FIG. 15 is a frontal view of the mobile device mount shown in FIG. 14.
Figure 19:
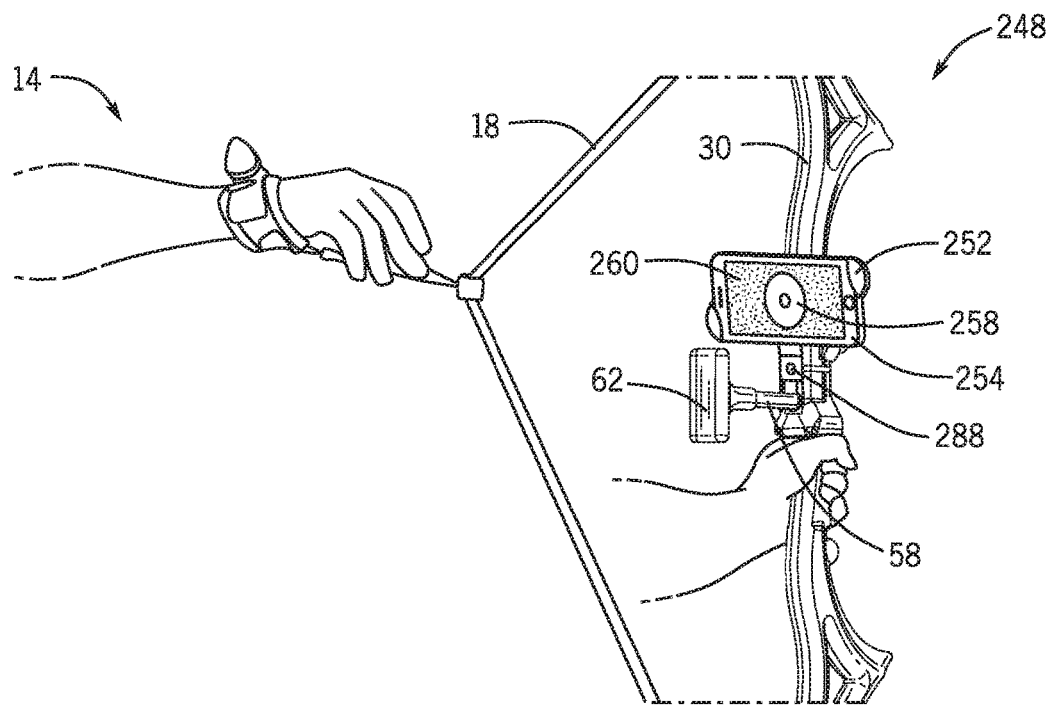
FIG. 19 is a perspective view of the training bow of FIG. 14, showing a user holding the resistance element of the training bow in a drawn position and a mobile device displaying a simulated real life archery scenario.

The mobile device holder 302 is comprised of two elongated rectangular bodies, wherein each elongated body includes a projection 318 designed to engage and grip the periphery, namely the corners, of the mobile device 254. In particular, the projection 318 includes a recessed area (not shown) that accepts an extent of the mobile device 254. Thus, as shown in FIGS. 15 and 19, part of the projection 319 is disposed over the front edge of the mobile device 254. Here, the first elongated rectangular body 320 is configured to be disposed within the second elongated rectangular body 322 and are coupled to one another by an internal spring (not shown) and a bolt/and nut 324. To remove an extent of the first elongated body 320 from the second elongated body 322 the user 14 must pull the first elongated body 320 away from the second elongated body 322 with enough force to overcome the inward biasing force exerted by the internal spring. Once the user 14 has removed an extent of the first elongated body 320 from the second elongated body 322, the user 14 may place the mobile device 254 between the projections 318. After the mobile device 254 is in place, the user 14 can release the first elongated body 320 from the second elongated body 322. Once released, the mobile device 254 will be secured to the mobile device mount 252 by the tension provided by the internal spring. To ensure that the mobile device 254 is secured to the bolt/nut 324 is utilized to hold the first and second elongated bodies 320, 322 into place. It should be understood that the mobile device mount 252 is made from injection molded plastic and that foam cushioning elements 326 may be placed in locations where the mobile device mount 252 may make contact with the mobile device 254.

The design of this mount 252 ensures that it is capable of mounting different size mobile devices 254 to the main body 30. For example, the mount 252 can receive mobile devices 254 that have a diagonal measurement of 4.75 inches to 8 inches. It should be understood that most of today's cellular enabled mobile devices fall within this range (e.g., iPhone 7 is approximately 5.75 inches or Galaxy S8+ is approximately 7 inches). It should be understood that the mount 252 may be configured to accept mobile devices that are smaller (e.g., 4 inches) or larger devices (e.g., 12 inches). In alternative embodiments, the mobile device mount 252 may be comprise of different mounts, such as suction cups, straps, or other mechanical coupling solutions that secure the mobile device 254 to the bow 10.

To use the archery application 256, the user 14 first obtains a mobile device 254, which has a MEMS gyroscope, a microphone, and display 255. These features are typically found in today's phones, such as the Apple iPhone 5 or Samsung Galaxy 5. It should be recognized that other electronic devices that have a display 255 and similar sensors may be used instead of a phone, such as a tablet. Further, it should be understood that a mobile device 254 or other electronic devices may have additional sensors or modules that may include a speaker, magnetometer, an accelerometer, a proximity sensor, barometer, an ambient light sensor, a dot projector, LiDAR sensor, cameras (e.g., a rear facing camera, a front facing camera, and/or an infrared camera), wireless modules (e.g., cellular, Wi-Fi, Bluetooth, WiMAX, HomeRF, Z-Wave, Zigbee, THREAD, RFID, NFC, and/or etc.), or location sensors (e.g., Global Positioning System ("GPS"), GLONASS, Galileo, QZSS, iBeacon, and/or etc.). These additional sensors and/or modules may be utilized in alternative embodiments that are discussed below.

Once the user 14 obtains the mobile device 254, the user 14 installs the archery application 256. This is typically done by downloading and installing the archery application 256 from an app store, such as Apple's App Store or Google Play. It should be recognized that the user 14 may download the archery application 256 onto the phone 254 from other locations, such as a local computer or another web-based server. In alternative embodiments, the virtual reality archery training system 248 may include a mobile device 254, which has the archery application 256 preinstalled.

Figure 17:
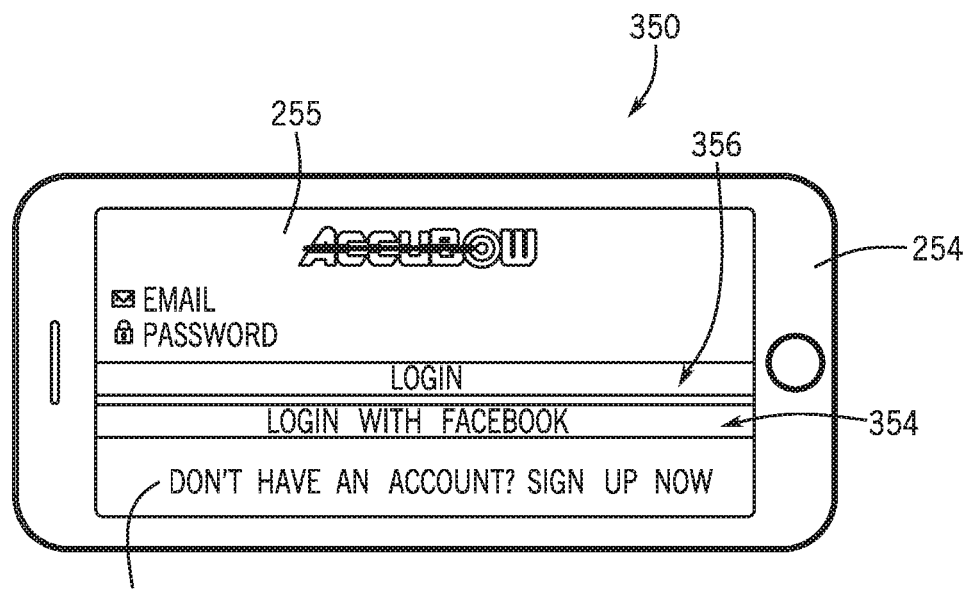
FIG. 17 is a frontal view of the mobile device shown in FIG. 14 with the archery application installed and displaying a login screen.

After the archery application 256 is downloaded, installed, and running, the user 14 may first encounter a login page 350, shown in FIG. 17. Here, the login page 350 may allow the user 14 to create an account 352. If the option to create an account 352 is selected, the archery application 256 will bring the user 14 to another screen, which will request the user 14 to input information about them (e.g., name, screen name, password, and/or etc.). Instead of the user 14 inputting information to create an account, the archery application 256 can generate an account for the user 14 based on information pulled from their Facebook profile 354. Regardless of what method is chosen by the user 14 to generate the account, the user 14 will be prompted to login 356 to access the features within the archery application 256. This enables the archery application 256 to keep track of the user's settings and game progress. For example, the archery application 256 may keep track of: 1) high scores, 2) purchases, 3) equipment upgrades, and/or 4) user settings (e.g., height of the user 14, arrow speed, or sight setup). In an alternative embodiment, the archery application 256 may allow the user 14 to access the features within the archery application 256 using a guest account. In a further embodiment, the user 14 may not be required to create an account to access the features within the archery application 256. However, it should be understood that if a guest account or no account is used, only a subset of the archery application's features may be available to the user 14.

The user's account may also allow the user 14 to access a social media or online community section of the archery application 256. This social media or online community allows fellow account holders the ability to discuss upcoming training challenges or hunting competitions on message boards or to post pictures of their newly captured high scores. This online community may include some or all of the following features: 1) message boards/news feed, 2) friending, 3) profile space, 4) timeline of user's past events, 5) ability to like or react to a user's post, 6) comment on a user post, 7) send a message, 8) create private messaging groups, 9) calendar events, 10) share a user's physical location, 11) share photos or videos, and/or 12) status updates. Additionally, the online community may also include other well-known features that are in use on other social media websites, such as Facebook, Twitter, MySpace, Orkut, Hi5, Mixi, QZone, Renren, Frindster, or etc.

After the archery application 256 is downloaded, installed, running, and the user 14 has logged in 356, the user 14 is prompted to enter their personal specifications. In particular, the user 14 may be asked to enter their height. The height range accepted by the archery application 256 may be between 2 and 8 feet. If the user 14 tries to enter a height out of this range, the archery application 256 will either: 1) provide a warning message to the user 14 that this height is out of range or 2) provide an error message to the user 14 requesting the user 14 to enter a height that is within range. The archery application 256 utilizes the height of the user 14 to adjust the height of the simulated targets 276 displayed within the application 256.

Additionally, the user 14 may be asked to enter their arrow speed. The arrow speeds accepted by the archery application 256 may be between 50 and 500 feet per second. If the user 14 tries to enter an arrow speed out of this range, the archery application 256 will either: 1) provide a warning message to the user 14 that this arrow speed is out of range, or 2) provide an error message to the user 14 requesting the user 14 enter an arrow speed that is within range. The archery application 256 utilizes the arrow speed of the user 14 to adjust the flight path of the simulated arrow 282 within the application 256. This helps make the archery application 256 closely approximate the shooting arrows using a traditional bow.

Further, the user 14 may be asked to set up their bow sight 258. The number of pins 264 a user 14 may include in their bow sight 258 may be between 1 and 10 pins 264. If the user 14 tries to enter a number of pins 264 out of this range, the archery application 256 will either: 1) provide a warning message to the user 14 that this number of pins is out of range or 2) provide an error message to the user 14 requesting the user 14 enter a number of pins within range. Once the user 14 enters the number of pins 264, the user 14 is then prompted to enter the distances that correspond to each pin 264. For example, if the user 14 desires to set up a bow sight 258 with three pins 264, then the user 14 may set the first pin at 20 feet, the second pin at 30 feet, and the third pin at 40 feet. This helps make the archery application 256 closely approximate the user's 14 traditional bow sight.

Alternatively, the archery application 256 may allow the user 14 to enter only a subset of the personal specifications (e.g., height, arrow speed, or pins contained within the user's sight). For example, the archery application 256 may only allow the user 14 to enter their height and not their arrow speed or the pins 264 contained within the sight 258. In this case, the archery application 256 may set a predefined arrow speed and predefined number of sight pins 264. This predefined arrow speed is preferably set between 235 and 335 feet per second, more preferably between 260 and 310 feet per second, and most preferably between 275 and 295 feet per second. The predefined number of sight pins 264 is preferably set between 1 and 6 pins 264, more preferably between 1 and 4 pins 264, and most preferably between 1 and 3 pins 264. Additionally, the archery application 256 may allow the user 14 to purchase or earn the ability to enter additional personal specifications. For example, the user 14 may be able to enter their arrow speed after completing a predefined number of challenges.

In a further embodiment, the archery application 256 may not allow the user 14 to enter any personal specifications. In this embodiment, the archery application 256 may set a predefined arrow speed, as discussed above, a predefined number of sight pins 264, as discussed above, and a predefined height for the user 14. Specifically, the predefined height of the user 14 is preferably set between 5.25 feet and 6.75 feet, more preferably between 5.5 and 6.50 feet, and most preferably between 5.75 and 6.25 feet.

Figure 18:
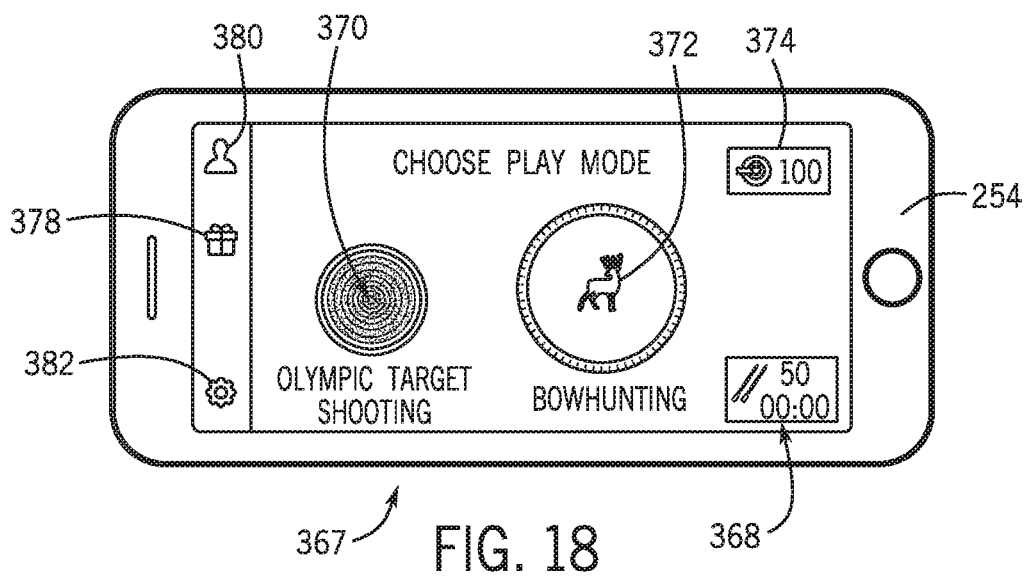
FIG. 18 is a frontal view of the mobile device shown in FIG. 14 with the archery application installed and displaying various simulated real life archery scenarios.

After the archery application 256 is downloaded, installed, running, the user 14 is logged in 356, and the user 14 has entered their personal specifications, the user 14 may land on a page 367 that prompts the user 14 to select an archery training scenario, TS. For example, the available archery training scenarios TS may include a hunting scenario 370 or Olympic target shooting 372, as shown in FIG. 18. It should be understood that other archery training scenarios may be available within the archery application (e.g., strength building scenario, trick shooting scenario, augmented reality archery training scenario, augmented reality archery challenge, virtual reality archery challenge, or coaching scenario). In addition, to displaying various available archery training scenarios, the page 367 also displays the amount of money the user 14 has in their account to purchase game upgrades 374 and the number of arrows 368 owned by the user 14.

Further, the page 367 includes the links to a store 378, the user's account 380, and the user's personal specifications 382. Upon selecting the store link 378, the user 14 may purchase additional arrows or other upgrades (e.g., no advertisements, high performance bow, or special arrows). Instead, if the user 14 selects the user's account link 380, the user 14 can view their account settings (e.g., screen name, most played level, and their high scores). Alternatively, if the user 14 selects the user's personal specifications link 382, the user 14 may view or alter their personal specifications, which may include height, arrow speed, and/or number of sight pins 264.

Figure 20:
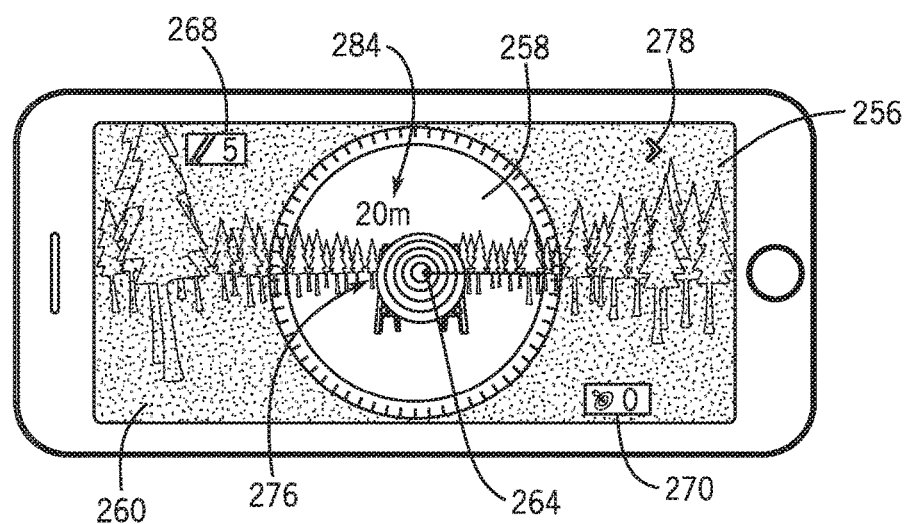
FIG. 20 is an enlarged view of the phone shown in FIG. 19, with the simulated real life archery scenario active on a mobile device.
Figure 21:
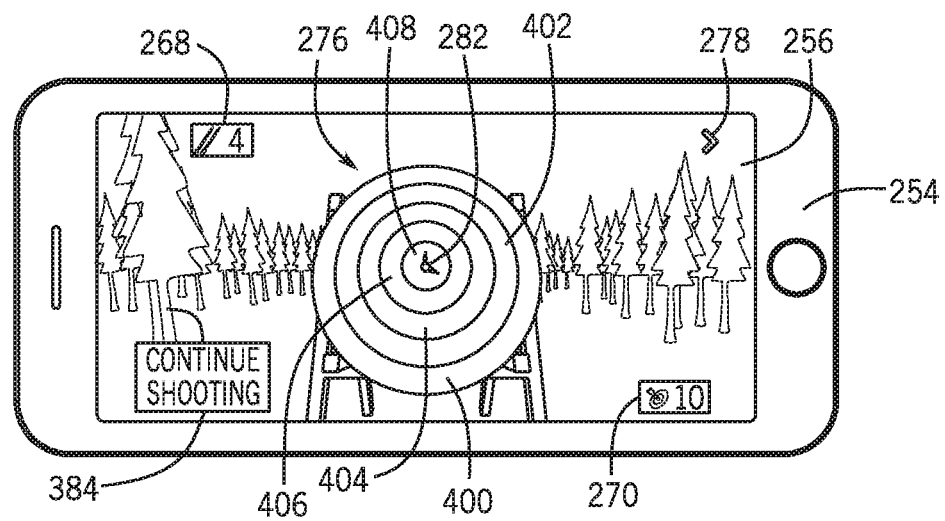
FIG. 21 is an enlarged view of the phone shown in FIG. 19, showing where a simulated arrow hit a simulated target within the simulated real life archery scenario.

After the archery training scenario TS is selected, the archery application 256 loads the appropriate graphics onto the screen 255 of the mobile device 254. FIGS. 19-21 show an example of the graphics that may be loaded on the screen 255 for an Olympic target shooting scenario 372. Specifically, the displayed graphics simulate what the user 14 would see while at an archery range with a traditional bow capable of firing an arrow at a target. First, the archer's field of view 260 is defined by using different colors to differentiate between what is contained within the sight 258 and what is contained outside of or beyond the sight 258 in the broader field of view 260. Second, distance dots or pins 264 may be displayed within the sight 258. Third, the archery application 256 displays session performance metrics including the number of arrows 268 the user 14 has left and the number of points 270 the user 14 has accumulated. Fourth, the archery application 256 displays the distance 284 to the simulated target 276. Finally, a link or button 278 to return to the main menu. It should be understood that more or less information may be displayed on the screen 255. For example, additional information that may be displayed includes: 1) links or buttons to select different types of arrows, 2) current round level, 3) the difficulty of the round, 4) timer, 5) other user's scores, 6) heart rate of the user 14, or-etc.

After the graphics are loaded, the user 14 can aim the bow 10 in different directions searching for a simulated target 276. Because the mobile device 254 is mounted to the archery training bow 10, the angle and direction of the mobile device 254 will approximate the angle and direction of the bow 10. Thus, when the user 14 moves the bow 10 to find a simulated target 276, the mobile device 254 senses this movement and updates the graphics on the screen 255. In other words, the archery application 256 creates a virtual reality training environment by simulating what the user 14 would see while trying to acquire a target on a practice range with the use of a bow capable of firing an arrow.

Specifically, the process of loading and updating the graphics on the mobile device 254 is described by the following process. First, the mobile device 254 uses its internal magnetometer to determine an initial reference point, including direction and pitch, of the mobile device 254. The archery application 256 utilizes this initial reference point in connection with the user's height to determine where to place the simulated target 276. Here, the simulated target 276 is generated approximately 40° degrees laterally from the initial reference point and at the same vertical level as the mobile device 254.

Once the initial reference point is determined, the archery application 256 utilizes the MEMS gyroscope to update the graphics displayed on the screen 255. In particular, the MEMS gyroscope measures the delta between the initial reference point and the current direction (e.g., direction and pitch) of the mobile device 254. This delta is then received and analyzed by the archery application 256. In response, the graphics rendered on the screen 255 in the archery application 256 are moved by the delta. For example, if the user 14 moves the mobile device 254 40° degrees to the left and decreases the pitch by 5° degrees, the archery application 256 renders graphics located in the virtual target range that are 40° degrees to the left and decreases the pitch by 5° degrees.

In alternative embodiments, the archery application 256 may only utilize the magnetometer, without the MEMS gyroscope, to determine the direction and pitch of the mobile device. Instead of determining the initial reference point and then calculating deltas between the reference point and the current location, the mobile device 254 may just query the magnetometer for the direction and pitch of the mobile device during each frame. This embodiment may be preferred if the mobile device 254 does not have a MEMS gyroscope or other like sensors. In further embodiments, the archery application 256 may use both the magnetometer and the MEMS gyroscope to further refine the determination of the mobile device's location in physical space. Finally, in other embodiments, the archery application 256 may also utilize the accelerometer and/or barometer in connection with the magnetometer and/or MEMS gyroscope to even further refine the determination of the mobile device's location in physical space. A more accurate physical location will allow a more accurate rendering of the graphics in virtual space.

Once the user 14 acquires and locks-in a simulated target 276 (i.e., the simulated target 276 shown in FIGS. 19-24), the user 14 draws the resistance element 18 back and aims at the simulated target 276 by placing the sight pin 264 on the simulated target 276. The user 14 then waits for an optimal time, which can be predetermined by the app 256 or be a function of the simulated target's 276 presence in the sight 258, to release the resistance element 18. Once this optimal time has been reached, the user 14 releases the resistance element 18 by either removing the user's fingers from the resistance element 18 or using the release aid 280. The resistance element 18 will then make contact with the damper end 62, which in turn produces a sound. This sound is recorded by the microphone that is integrated into the mobile device 254. If the level of this sound is over a predefined level, a simulated arrow 282 will be fired within the archery application 256. If the level of this sound is not over a predefined level, a simulated arrow 282 will not be fired within the archery application 256. In other words, similar to the firing of an arrow by releasing a bow string on a traditional bow, a simulated arrow 282 is fired in the archery application 256 when the resistance element 18 is released. Also, similar to how an arrow will not be fired from a traditional bow if the bow string is not drawn back to a certain extent, the simulated arrow 282 will not be fired in the archery application 256 unless the resistance element 18 is drawn back far enough to generate a sound (i.e., the contact of the resistance element 18 with the damper 62) that is greater than a predetermined threshold.

This predetermined sound level is preferably above 50% of the max volume the microphone can record, more preferably above 80% of the max volume the microphone can record, and most preferably above 90% of the max volume the microphone can record. These sound levels help ensure background noise or ambient noise does not cause the simulated arrow 282 to be fired without the release of the resistance element 18. In other embodiments this predetermined sound level is preferably above 61 dBs, more preferably above 76 dBs, and most preferably above 85 dBs. It should be understood that other sound levels may be used.

The sound generated from the contact of the resistance element 18 with the damper 62 may not have a unique sound profile. If this is the case, a simulated arrow 282 will be fired in the archery application 256 based only on the level of the sound generated by the contact of the resistance element 18 and the damper 62. In other embodiments, the contact of the resistance element 18 with the damper 62 may have a unique sound profile. For example, the sound profile may be equivalent to a specific note (e.g., C, D, E, F, G, A, B). In this embodiment, the sound profile along with the sound level may be used to determine whether a simulated arrow 282 should be fired within the archery application 256. Instead of using both the sound level and the sound profile, just the sound profile may be used in an alternative embodiment.

In another embodiment, different sensors contained within the mobile device 254 may be used to determine when a simulated arrow 282 was fired. Instead of using the microphone, the mobile device 254 may use the accelerometer to measure the vibration caused by the contact between the resistance element 18 with the damper 62. If the vibration level is over a predefined level, a simulated arrow 282 will be fired within the archery application 256. If the vibration level is not over a predefined level, a simulated arrow 282 will not be fired within the archery application 256. Alternatively, the mobile device 254 may use the barometer to measure the pressure caused by the contact between the resistance element 18 with the damper 62. If the pressure level is over a predefined level, a simulated arrow 282 will be fired within the archery application 256. If the pressure level is not over a predefined level, a simulated arrow 282 will not be fired within the archery application 256. In a further embodiment, either: 1) a LiDAR sensor, 2) forward facing camera, or 3) forward facing infrared camera may be used to determine the firing of a simulated arrow 282. In particular, these sensors can detect the rapid movement of the resistance element 18 towards the bow 10, upon which will cause the simulated arrow 282 to be fired within the archery application 256. It should be understood that any combination of these sensors may be used in determination of when a simulated arrow 282 is fired.

As discussed above, the archery application 256 may set a predefined arrow speed or may allow the user 14 to enter their arrow speed. In certain embodiments, the virtual reality archery training system 248 may fire the simulated arrow 282 at the predetermined speed regardless of how much force is generated above a predefined threshold. For example, irrespective of whether there is 10 pounds on the resistance member or 70 pounds on the resistance member, the simulated arrow 282 will fly at the same speed as long as the sound generated from the contact between the resistance element 18 and the damper end 62 is above the predefined threshold (e.g., 90% of the max volume the microphone can record).

In contrast, other embodiments of the virtual reality archery training system 248 may adjust the arrow speed depending on force generated above a predefined threshold. For example, a full draw of the resistance member 18, set to 30 pounds, may fire the simulated arrow 282 at 300 feet per second. Meanwhile, a full draw of the resistance member 18, set to 70 pounds, may fire the simulated arrow 282 at 500 feet per second. Or in another example, a full draw of the resistance member 18, set to 35 pounds, may fire the simulated arrow 282 at 300 feet per second. Meanwhile, a half draw of the resistance member 18, set to 70 pounds, may fire the simulated arrow 282 at 300 feet per second. Nevertheless, it should be understood that a predefine threshold must be met before the simulated arrow 282 is fired. This will help ensure that the user 14 intended to fire the simulated arrow 282.

This embodiment calculates the arrow speed by analyzing the sound made from the contact between the resistance element 18 and the damper end 62. First, the archery application 256 determines whether the sound is greater than the predefined threshold (e.g., 75% of the max volume of the microphone) as discussed above. If it is not greater than the predefined threshold, then the simulated arrow 282 is not fired. If it is greater than the predefined threshold, then the archery application 256 calculates the arrow speed based on the noise level. For example, if the sound is at 75% of the max volume, then the simulated arrow 282 speed is calculated to be 300 feet per second. However, if the sound is at 95% of the max volume, then the arrow speed is calculated to be 380 feet per second.

In other embodiments, the arrow speed may be adjusted based on the level of vibration measured by the accelerometer, which was generated by the contact between the resistance element 18 and the damper end 62. In particular, the mobile device 254 may calculate the arrow speed to be a first value, if the vibrations measured are at a first level, while calculating the arrow speed to be at two times the first value, the vibrations measured are two times the first level. Alternatively, in another embodiment, the user 14 may be asked to input the tension setting or value of the adjustment mechanism 170. The front facing camera then may analyze the draw length of the user 14 and vary the speed of the simulated arrow 282 based on the calculations of the draw length and the tension applied to the resistance member 18. Further, in another embodiment, the damper end 62 may have a pressure sensor, which wirelessly communicates with the mobile device 254. The pressure sensor will measure the force exerted on the damper end 62 by the resistance member 18. The archery application 256 may utilize this pressure data to determine whether a simulated arrow 282 was fired and the associated speed of the simulated arrow 282.

In another embodiment, the damper end 62 may produce different sound profiles (e.g., different notes) depending on the force exerted by the damper end 62 by the resistance member 18. For example, the damper end 62 may produce a D note if a first predetermined amount of force is received, while producing an F note if a second predetermined amount of force is received. In this embodiment, the microphone within the mobile device 254 will record these different sound profiles and the archery application 256 will use these different sound profiles to calculate the speed of the simulated arrow 282. In this example, the simulated arrow 282 speed for a D note may be 300 feet per second, while the simulated arrow 282 speed for an F note may be 375 feet per second.

In a further embodiment, the archery application 256 may use the arrangement and application of the sensors described in the above embodiments to accurately determine the draw weight of the resistance member 18. Specifically, the resistance member 18 may lose its elasticity over time, which may affect the draw weight of the resistance member 18. To help ensure that the draw weight is where the user 14 desires, the archery application 256 may instruct the user 14 to fully draw and release the resistance member 18. Once released, the archery application 256 will analyze the impact (e.g., sound level, pressure sensor, vibration level, or sound profile) to determine the draw weight of the resistance element 18. This draw weight is then displayed on the screen 255. The user 14 can use the adjustment mechanism 170 to vary the tension level on the resistance element 18 and then repeat the above steps. This process can be repeated until the tension level is where the user 14 desires.

Once the archery application 256 determines that a simulated arrow 282 has been fired, the application 256 must also determine what direction the simulated arrow 282 was fired. Both the bow 10 and the mobile device 254 are pointed in the same direction due to the fact the mobile device 254 is mounted to the bow 10. Thus, the archery application 256 can use the direction the mobile device 254 was pointing as a proxy for the direction the bow 10 is pointing. Here, the archery application 256 records in a log the direction (e.g., horizontal, vertical, and rotational) the mobile device 256 was facing during every frame. During one second approximately 60 frames occur. To minimize the burden on the mobile device 254, the archery application's log may only store the directions measured during each frame that occurred in the last 5 minutes (i.e., about 18,000 frames), more preferably during the last 2 minutes (i.e., about 7,200 frames), and most preferable during the last 30 seconds (i.e., 1,800 frames). The archery application 256 analyzes this log to determine the direction the mobile device 254 was pointing before and after the simulated arrow 282 was fired. In particular, the archery application 256 determines each direction the mobile device 254 was pointing during the six frames prior to the firing of the simulated arrow 282 and the direction the mobile device was pointing one frame after the simulated arrow 282 was fired. Then the archery application 256 averages these directions together (e.g., six direction prior to firing and the one direction after firing) to determine the direction the bow 10 was pointing when the simulated arrow 282 was fired. It should be understood that more or less frames may be analyzed. For example, the archery application 256 may analyze between 20-3 frames prior to the firing of the simulated arrow 282 and 10-0 frames after the firing of the simulated arrow 282.

Once the archery application 256 determines that a simulated arrow 282 has been fired and its direction, the archery application 256 displays its flight path on the screen. In one embodiment, this flight path may be a straight line or linear. In other words, exactly where the user 14 aims the pin 264 is where the simulated arrow 282 will land. In this embodiment, the archery application 256 does not apply any gravitational force or wind.

In an alternative embodiment, the archery application 256 applies a gravitational force on the simulated arrow 282. To apply this gravitational force, the archery application 256 must know the weight of the simulated arrow 282. This weight may be predefined and is preferably between 250 and 600 grains, more preferably between 350 and 500 grains, and most preferably between 375 and 425 grains. Alternatively, the user 14 may set this arrow weight or the user 14 may be able to purchase arrows 282 having different weights. For example, the user 14 may select a heavier arrow 282 weight while hunting larger animals. In this example, the archery application 256 may award more points for a shot that is slightly off target when using a heavier arrow 282 in comparison to a shot in the same location with a lighter arrow 282. Further, in this example, the archery application 256 may require that the user 14 take into account the use of a heavier arrow 282 when aiming at the simulated target 276. Regardless, of which arrow 282 weight is used, the application 256 of a gravitational force will cause the arrow 282 to fall towards the ground as it moves towards the simulated target 276. Thus, in this embodiment, the user 14 will have to account for this gravitational force when aiming at the simulated target 276. One way the archery application 256 may aid the user 14 in accounting for this gravitational force is by allowing the user 14 to set up multiple pins 264 within their sight 258, which each pin 264 may be set at a different distance. Thus, the user 14 may use the first pin to aim at a simulated target 276 that is 20 meters away, while using a second pin to aim at a simulated target 276 that is 30 meters away.

In an alternative embodiment, flight path of the simulated arrow 282 may be affected by simulated wind. In this case, the direction and the wind speed may be determined by the archery application 256. For example, the wind may be blowing from the north at 10 miles an hour. This information is displayed to the user 14 on the screen of the mobile device 254, which in turn tells the user 14 that they have to take this into account when aiming at the simulated target 276. Additionally, the speed and direction of the wind may be preprogramed into certain levels to increase their difficultly. Alternatively, the user 14 may set the wind difficulty level to a value between 0 and 10, with 10 being the hardest (i.e., fastest wind speed and most difficult direction based on the location of the simulated target 276).

It should be understood that different combinations of these features may be utilized by the archery application 256. For example, the application 256 may not apply a gravitational force, but may apply simulated wind. Or, the application 256 may just apply gravitational force. Or, the application 256 may apply gravitational force and wind. It should also be understood that other external forces, such as air temperature, elevation, or etc., may be utilized.

FIGS. 19-21 show a simulated target 276 displayed in an Olympic target shooting scenario 372. In particular, the Olympic target is shown a simulated target 276 with five concentric circles. In this scenario, one point will be awarded for an arrow that lands in the outermost ring 400, three points for an arrow that lands in the next outermost ring 402, six points for an arrow that lands in the next outermost ring 404, seven points for the next outermost ring 406, and ten points for the innermost ring. Once the flight path of the simulated arrow 282 is displayed on the screen 255, the archery application 256 will display where the simulated arrow 282 hit the simulated target 276, as shown in FIG. 21. Here, the simulated arrow 282 hit the innermost circle or hit a bullseye 406. In response to hitting this location with the simulated arrow 282, the archery application awarded the user ten points. The user 14 will then must press the "continue shooting" button 384 on the lower left side of the display 255. Once the "continue shooting" button 384 is pressed, the user can fire another arrow.

Figure 22:
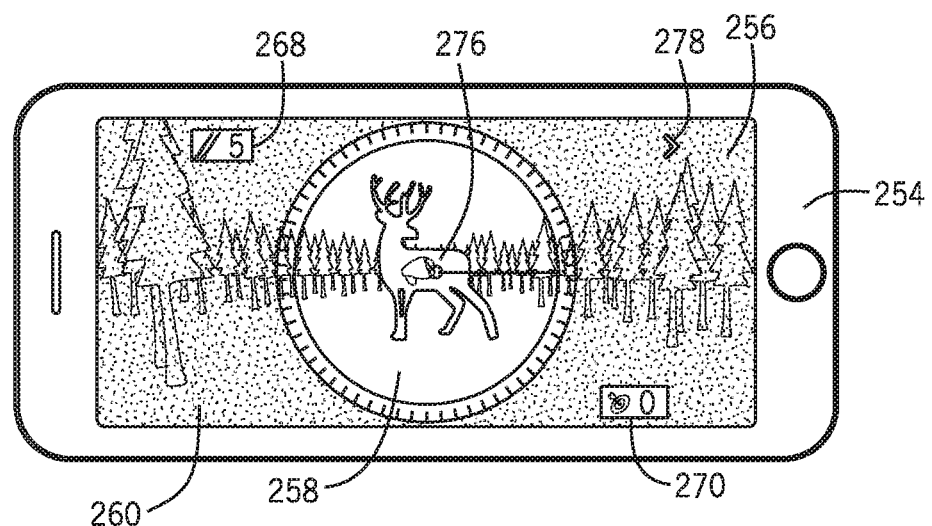
FIG. 22 is an enlarged view of the phone shown in FIG. 19, with the alternative embodiment of a simulated real life archery scenario active on a mobile device.
Figure 23:
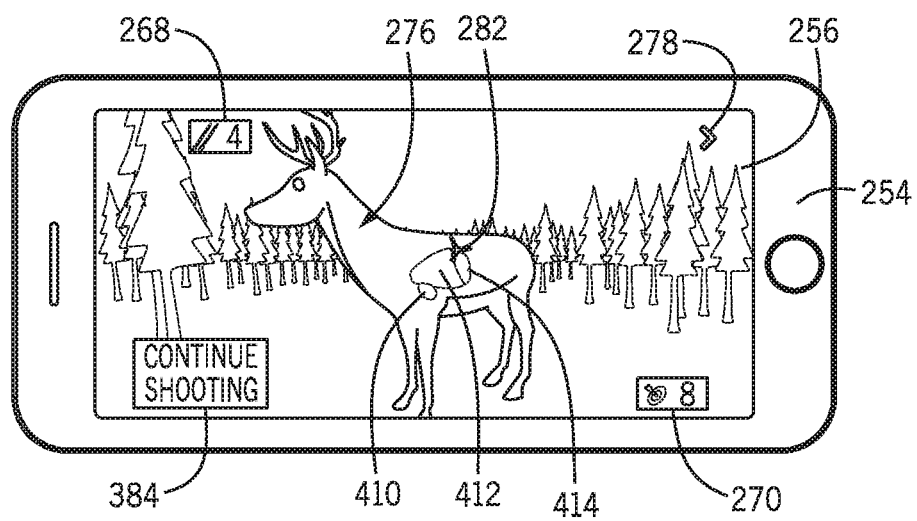
FIG. 23 is an enlarged view of the phone shown in FIG. 19, showing where a simulated arrow hit a simulated target within the alternative embodiment of a simulated real life archery scenario.
Figure 24:
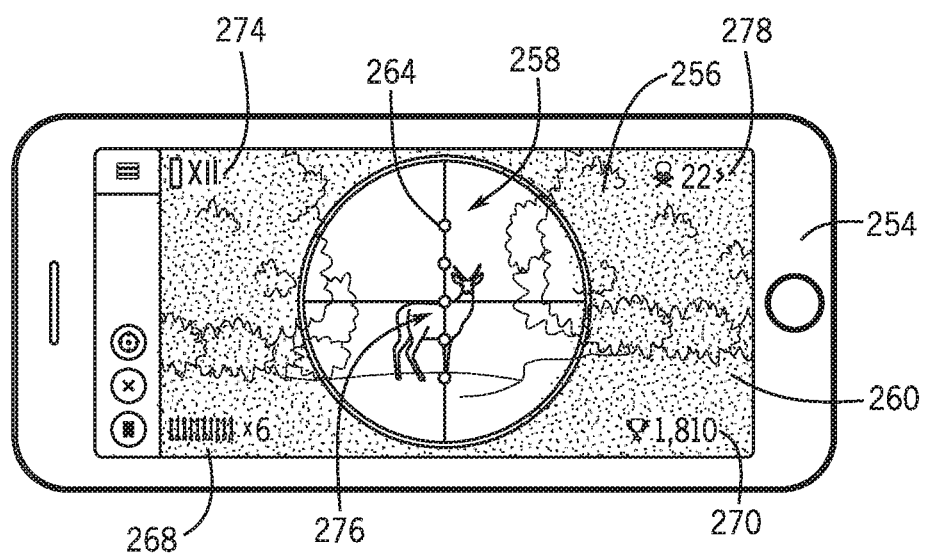
FIG. 24 is an enlarged view of the phone shown in FIG. 19, with an alternative embodiment of a simulated real life archery scenario active on a mobile device.

FIGS. 22-24 show a simulated target 276 (e.g., a deer) displayed in a hunting scenario 370. In this scenario, once the user places a pin 264 over the deer, the exterior of the deer becomes transparent and displays vital organs that an archer should aim for when hunting a deer with a traditional bow that is capable of firing an arrow. Specifically, the heart, lungs, and liver are shown in FIGS. 22-23. Here, the archery application 256 will award the user with twelve points for an arrow that lands in the heart 410, eight points for an arrow that lands in the lungs 412, and four points for an arrow that lands in the liver 414. Once the flight path of the simulated arrow 282 is displayed on the screen 255, the archery application 256 will display where the simulated arrow 282 hit the simulated target 276, as shown in FIG. 23. Here, the simulated arrow 282 hit the lungs 412. In response to hitting this location with the simulated arrow 282, the archery application awarded the user eight points. The user 14 then must press the "continue shooting" button 384 on the lower left side of the display 255. Once the "continue shooting" button 384 is pressed, the user can fire another arrow.

Upon collecting sufficient points 270, the user 14 is allowed to move to a later round 274 in the archery training scenario. In later rounds 274, the simulated targets 276 may get smaller or move more quickly-be more evasive. Or the surrounding terrain may cause the simulated target 276 to be more difficult to sight or provide the simulated target 276 with greater cover. For example, the simulated targets 276 may move to the right or to the left of the screen 255 or the simulated targets 276 may move towards or away from the user 14. Other examples of simulated targets 276 may include objects (e.g., bottles, cans, hoops, or etc.) or other animals (e.g., elk, bears, moose, caribou, bighorn sheep, pronghorn, boars, javelin, zombies, or etc.)

The archery application 256 may include other archery training scenarios, such as strength building scenario, augmented reality archery training scenario, virtual reality archery challenges, or an augmented reality archery challenge. For example, a strength building scenario may instruct the user 14 or archer to draw the resistance element 18 back and hold the bow 10 in a still or hold position for a first predetermined amount of time (e.g., 30 seconds). The scenario will award points to the user 14 based on how still the user 14 holds the bow 10 with a drawn resistance element 18. The scenario then may request that the user 14 repeat this exercise multiple times after a second predetermined amount of time (e.g., 1 minute) and then award or subtract points based upon the user's performance during that period of time. This strength building scenario works by using the MEMS gyroscope contained within the mobile device 252 to measure the movement of the bow 10 during the first predetermined amount of time. The less movement sensed by the MEMS gyroscope the more points the user 14 earns.

Instead of using the MEMS gyroscope, this scenario may use other sensors that are built into the mobile device 254, such as the accelerometer, to measure the movement of the bow 10 during the predetermined amount of time. Further, this scenario may use a forward facing camera to start the countdown of the predetermined amount of time. In particular, the forward facing camera detects when the user 14 has fully drawn back the resistance element 18 by taking pictures of the user 14 and analyzing the angle of the resistance element 18 and/or proximity of the resistance element 18 to the user's 14 face. Alternatively, this scenario may use: 1) LiDAR sensor or 2) the forward facing infrared camera and the dot projector, instead of the forward facing camera. Both of these alternative sensors can detect and analyze the distance the user 14 has drawn the resistance element 18.

In another embodiment, the archery application 256 may include an augmented reality archery training scenario. In this training scenario, the archery application 256 may use the rear facing camera to capture the environment of the user. This environment is then displayed on the screen of the mobile device 254 along with simulated targets 276 that are generated within the archery application 256. In other words, the mobile device 254 may display the user's room with a simulated target 276 (e.g., a deer) in the room. Alternatively, the archery application 256 may analyze the user's environment and find appropriate simulated targets 276 (e.g., bottles, cups, etc.). Once a simulated target 276 is found, the archery application 256 will display a simulated target 276 ring around the item and assign a point value to the simulated target 276. Like other scenarios that have been described above, this scenario will use the mobile device's 252 MEMS gyroscope to analyze the direction of the bow 10 and the microphone to determine when the simulated arrow 282 is fired within the archery application 256. However, unlike other scenarios, this scenario will use the rear facing camera to display the user's environment. It should also be understood that other sensors (e.g., magnetometer, an accelerometer, barometer, a dot projector, LiDAR sensor, and/or cameras) may be used in addition or instead of the MEMS gyroscope to determine the direction of the bow 10 or when the simulated arrow 282 should be filed.

In another embodiment, the archery application 256 may include a virtual reality archery challenge. The game mode allows the user 14 to challenge other account holders to a virtual reality archery competition, regardless of each user's physical location. In these challenges, the two challengers may enter a virtual archery range, where each user 14 takes turns to see who can score the most points. After the challenge has concluded, the results of the challenge may be posted on a message board for other users 14 to see. This game mode uses the same mechanics of how the graphics are rendered/updated, the determination of whether a simulated arrow 282 was fired, and the flight path of the arrow 282 as described above.

In another embodiment, the archery application 256 may include an augmented reality archery competition. Unlike the virtual reality archery competitions, this augmented reality archery competition takes into account the participants physical location. Thus, participants must be physically located within the same geographical area (e.g., 25 miles) to challenge one another. Specifically, in these augmented reality competitions, a map is shown to the user that displayes: 1) the user's location, 2) competitors' location, and 3) virtual archery simulated targets 276. The user 14 and the competitors (collectively, participants) can move their physical location, which in turn moves there augmented reality location. The participants may move towards simulated targets 276 and when in range, the participants may engage virtual simulated targets 276. Points are awarded based on the number of simulated targets 276 engaged by each participant; thus, the participant with the most points at the end of the competition wins.

This game mode uses the same mechanics of how the graphics are updated, the determination of whether a simulated arrow 282 was fired, and the flight path of the arrow 282 as described above. However, this game mode also takes into account the user's physical location. This is done by first determining the physical location of each of the participant's mobile devices 254 by using the location sensors (e.g., GPS, GLONASS, Galileo, QZSS, iBeacon, and/or etc.) that are built into the mobile devices 254. The mobile devices 254 may also use other sensors (e.g., barometer and/or magnetometer) to increase the accuracy of the determined locations. This information is then sent wirelessly to the backend servers of the archery application 256. These servers utilize the location information of all participants in connection with other challenge settings (e.g., difficulty of the challenge) to then generate simulated targets 276. These simulated targets 276 are then displayed on every participant's mobile device 254 based on the map overlay. A participant may then attempt to approach a simulated target 276 by moving their physical location towards the simulated target 276, which in turn moves their virtual location towards the simulated target 276. Once in range, the participant may try and engage the simulated target 276. The archery application 256 keeps track of the simulated targets 276 the participants engaged and their associated points. Once the competition has ended, the archery application 256 determines which participant is the winner by comparing the participant's point totals to one another. This augmented reality competition tries to closely approximate a real life hunting competition, where participants are required to track and engage simulated targets 276.

In an alternative embodiment, the mobile device 254 in the virtual reality archery training system 248 may be moved from being located on the bow 10 to being located within a virtual reality headset. In this embodiment, a sensor is connected to the bow 10 via a mount port 250. This sensor contains at least a wireless module (e.g., Bluetooth) and a movement sensor (e.g., gyroscope or magnetometer). Here, the movement sensor will detect the position of the bow 10 and this information will be communicated wirelessly, via the wireless module, to the mobile device 254. The mobile device 254 will be positioned within a virtual reality headset, such as Google Cardbord, Merge VR Goggles, Carl Zeiss VR One Plus, Xiaomi Play2, and like models. This embodiment will uses similar mechanics of how the graphics are updated, the determination of whether a simulated arrow 282 was fired, and the flight path of the arrow 282, as described above. The primary difference is in this embodiment, an external set of sensors and modules are used instead of the sensors and modules contained within the user's mobile device 254.

In a further embodiment, the mobile device 254 in the virtual reality archery training system 248 is completely replaced by a combination of sensors and wireless modules that are coupled to the bow 10 and an external processing unit. The external processing unit may be a video game console (e.g., PlayStation or Xbox) or a computer. In this embodiment, a sensor is connected to the bow 10 via a mount port 250. This sensor contains at least a wireless module (e.g., Bluetooth) and a movement sensor (e.g., gyroscope or magnetometer). Other modules may be contained within the sensors (e.g., optical light source). Here, the movement sensor will detect the position of the bow 10 and this information will be communicated wirelessly, via the wireless module, to the external processing unit. The external processing unit will be in communication, preferably wireless communication, with a headset. Such headsets include: Sony PlayStation VR headset, HTC Vive, and Oculus Rift. This embodiment will uses similar mechanics of how the graphics are updated, the determination of whether a simulated arrow 282 was fired, and the flight path of the arrow 282, as described above. The primary difference is in this embodiment, an external processing unit is processing all of the information and a set of an external set of sensors and modules are used instead of the sensors and modules contained within the user's mobile device 254.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Other implementations are also contemplated.

The invention claimed is:

1. A virtual reality archery training system, comprising:
   archery training bow, wherein the archery training bow includes:
   a main body having a handle;
     a resistance member, said resistance member is attached to an adjustable tension mechanism that permits a user to vary the tension of the resistance member;
     a vibration damper coupled to the main body;
     a mobile device mount disposed between the handle and a first end of the main body; and
     a mobile device releasably coupled to the mobile device mount and having a display, a microphone, and an archery application installed thereon,
   wherein: (i) the microphone is configured to record sounds produced from contact between the resistance member and an end of the vibration damper and (ii) the archery application is configured to render graphics on the display that simulate real life archery scenarios.

2. The virtual reality archery training system of claim 1, wherein the mobile device includes a magnetometer, MEMS gyroscope, and a display;
   said magnetometer is configured to provide an initial reference point for the archery application;
   said MEMS gyroscope is configured to inform the archery application how far the mobile device has moved from the initial reference point; and
   wherein the graphics rendered on the display are altered based on the movement of the mobile device from the initial reference point.

3. The virtual reality archery training system of claim 1, wherein a simulated arrow is fired within the archery application if the sound produced from contact between the resistance member and the end of the vibration damper is greater than a predetermined value.

4. The virtual reality archery training system of claim 3, wherein a flight path of the simulated arrow is shown on the display.

5. The virtual reality archery training system of claim 4, wherein the flight path of the simulated arrow is affected by a simulated gravitational force.

6. The virtual reality archery training system of claim 5, wherein different point values are awarded based on whether the simulated arrow hits a simulated target.

7. The virtual reality archery training system of claim 1, wherein the simulated real life archery scenarios is one of the following: i) hunting, ii) Olympic target shooting, iii) strength building, iv) augmented reality archery training scenario, v) virtual reality archery challenge, or vi) augmented reality archery challenge.

8. The virtual reality archery training system of claim 1, wherein the archery application allows a user to input personal specifications, said personal specifications include one of the following: height, arrow speed, or number of sight pins.

9. A method of using an archery training bow assembly without releasing an arrow, comprising:
   providing an archery training bow assembly, the archery training bow assembly including a main body, a damper coupled to the main body, a resistance member operably connected to the main body, and a mobile device releasably coupled to the main body and having both an integrated microphone and an archery application installed thereon;

drawing the resistance member from an initial position to a drawn position;

holding the resistance member in the drawn position while aiming the archery training bow at a simulated target generated by the archery application on a display integrated into the mobile device;

releasing the resistance member after a predefined amount of time;

using the microphone to record the sound caused by contact between the resistance member and the damper; and rendering graphics on the display that simulate a real life archery scenario.

10. The method of claim 9, further comprising a step of using a magnetometer and a MEMS gyroscope, both of which are integrated into the mobile device, to determine a direction and angle of the bow and in response generating graphical representation of what is located at the determined direction and angle in the archery application.

11. The method of claim 9, wherein the real life archery scenario simulated by the graphics rendered on the display is a simulated arrow fired when the recorded sound is above a predefined value.

12. The method of claim 11, further comprising a step of displaying a flight path of the-simulated arrow.

13. The method of claim 12, further comprising a step of displaying a contact location on the simulated target where the simulated arrow made contact.

14. The method of claim 13, further comprising a step of displaying points that were awarded based on the location of where the simulated arrow contacted the simulated target.

15. The method of claim 9, wherein the simulated target is an animal or an Olympic target.

16. The method of claim 9, further comprising the step of inputting a user's personal specification, said personal specifications include one of the following:

height, arrow speed, or number of sight pins.

17. A virtual reality archery training system, comprising:

archery training bow, wherein the archery training bow includes:

a main body, a resistance member that is operably coupled to the main body, a vibration damper coupled to the main body, a mobile device mount coupled to the main body, and a mobile device releasably coupled to the mobile device mount, the mobile device having: (i) a display, (ii) a sensor, and (iii) an archery application installed thereon;

wherein the sensor is configured to wirelessly determine when the resistance member makes sufficient contact with the end of the vibration damper, which causes the archery application to render a flight path of the simulated arrow on the display.

18. The virtual reality archery training system of claim 17, wherein the sensor is any one of the following: (i) microphone, (ii) front facing camera, (iii) LiDAR sensor, or (iv) barometer.

19. The virtual reality archery training system of claim 17, wherein archery application includes an online community section.

* * * * *